United States Patent
Yang et al.

(10) Patent No.: US 11,283,558 B2
(45) Date of Patent: Mar. 22, 2022

(54) METHOD AND APPARATUS FOR UPLINK AND DOWNLINK TRANSMISSION ALIGNMENT

(71) Applicant: XI'AN ZHONGXING NEW SOFTWARE CO., LTD., Xi'an (CN)

(72) Inventors: Ling Yang, Shenzhen (CN); Yajun Zhao, Shenzhen (CN); Hanqing Xu, Shenzhen (CN); Xincai Li, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 176 days.

(21) Appl. No.: 16/476,811

(22) PCT Filed: Jan. 9, 2018

(86) PCT No.: PCT/CN2018/071979
§ 371 (c)(1),
(2) Date: Oct. 22, 2019

(87) PCT Pub. No.: WO2018/127208
PCT Pub. Date: Jul. 12, 2018

(65) Prior Publication Data
US 2020/0044796 A1   Feb. 6, 2020

(30) Foreign Application Priority Data

Jan. 9, 2017 (CN) .......................... 201710014036.9

(51) Int. Cl.
*H04L 5/00* (2006.01)
*H04W 56/00* (2009.01)

(52) U.S. Cl.
CPC ....... *H04L 5/0005* (2013.01); *H04W 56/0045* (2013.01)

(58) Field of Classification Search
CPC ... H04L 5/0005; H04L 5/0007; H04L 5/0053; H04L 5/0073; H04W 56/004; H04W 56/0045; H04W 56/005
See application file for complete search history.

(56) References Cited

U.S. PATENT DOCUMENTS 8,462,688 B1 * 6/2013 Dinan ................. H04W 72/005
370/312
8,848,742 B2 * 9/2014 Zhang ................. H04L 27/2607
370/476

(Continued)

FOREIGN PATENT DOCUMENTS

CN   101415189 A   4/2009
CN   101873688 A   10/2010

(Continued)

OTHER PUBLICATIONS

International Search Report of PCT Application No. PCT/CN2018/071979—4 pages (dated Apr. 3, 2018).

(Continued)

*Primary Examiner* — Kevin D Mew
(74) *Attorney, Agent, or Firm* — Knobbe, Martens, Olson & Bear, LLP

(57) ABSTRACT

Provided is a method and apparatus for aligning uplink transmission with downlink transmission. The method includes at least one of: obtaining a time unit; performing at least one of uplink transmission or downlink transmission on a spectrum resource corresponding to the time unit; or configuring at least one timing advance (TA) adjustment amount over the time unit.

20 Claims, 13 Drawing Sheets

(56) References Cited

U.S. PATENT DOCUMENTS

| | | | | |
|---|---|---|---|---|
| 9,178,674 B2* | 11/2015 | Yi | ............... | H04L 5/0053 |
| 2005/0232183 A1* | 10/2005 | Sartori | ............... | H04W 72/0406 |
| | | | | 370/319 |
| 2008/0229367 A1* | 9/2008 | Cheng | ............... | H04B 7/022 |
| | | | | 725/62 |
| 2009/0204862 A1* | 8/2009 | Chun | ............... | H04L 5/0053 |
| | | | | 714/748 |
| 2010/0118806 A1* | 5/2010 | Griot | ............... | H04L 27/2607 |
| | | | | 370/329 |
| 2010/0177747 A1* | 7/2010 | Chun | ............... | H04W 72/0446 |
| | | | | 370/336 |
| 2010/0238872 A1* | 9/2010 | Kim | ............... | H04W 74/008 |
| | | | | 370/329 |
| 2010/0284376 A1* | 11/2010 | Park | ............... | H04W 56/0045 |
| | | | | 370/336 |
| 2010/0296454 A1* | 11/2010 | Park | ............... | H04L 1/1812 |
| | | | | 370/328 |
| 2011/0044188 A1 | 2/2011 | Luo et al. | | |
| 2011/0243121 A1* | 10/2011 | Chin | ............... | H04W 56/0005 |
| | | | | 370/350 |
| 2011/0249550 A1* | 10/2011 | Luz | ............... | H04W 56/0045 |
| | | | | 370/216 |
| 2011/0292917 A1* | 12/2011 | Fan | ............... | H04L 27/2636 |
| | | | | 370/336 |
| 2012/0039221 A1 | 2/2012 | Lim et al. | | |
| 2012/0063425 A1* | 3/2012 | Wang | ............... | H04W 56/0045 |
| | | | | 370/336 |
| 2014/0044050 A1* | 2/2014 | Lu | ............... | H04W 24/04 |
| | | | | 370/328 |
| 2014/0086219 A1* | 3/2014 | Suzuki | ............... | H04W 56/0005 |
| | | | | 370/336 |
| 2014/0098798 A1* | 4/2014 | Khandekar | ............... | H04W 56/0005 |
| | | | | 370/336 |
| 2014/0119313 A1* | 5/2014 | Yang | ............... | H04L 5/001 |
| | | | | 370/329 |
| 2014/0133430 A1* | 5/2014 | Yang | ............... | H04L 5/0055 |
| | | | | 370/329 |
| 2015/0249980 A1* | 9/2015 | You | ............... | H04L 5/001 |
| | | | | 370/329 |
| 2016/0192306 A1* | 6/2016 | Ma | ............... | H04W 56/00 |
| | | | | 370/350 |
| 2016/0219393 A1* | 7/2016 | Wang | ............... | H04W 4/70 |
| 2016/0294595 A1* | 10/2016 | Harada | ............... | H04L 27/2646 |
| 2016/0352551 A1* | 12/2016 | Zhang | ............... | H04L 27/26025 |
| 2017/0033887 A1* | 2/2017 | Lei | ............... | H03H 17/065 |
| 2017/0085346 A1* | 3/2017 | Tiirola | ............... | H04W 56/0045 |
| 2019/0116008 A1* | 4/2019 | Dinan | ............... | H04L 5/008 |
| 2020/0280466 A1* | 9/2020 | Cui | ............... | H04B 7/0617 |

FOREIGN PATENT DOCUMENTS

| | | |
|---|---|---|
| CN | 102111257 A | 6/2011 |
| CN | 102265661 A | 11/2011 |
| CN | 105357162 A | 2/2016 |

OTHER PUBLICATIONS

Huawei et al., Timing Alignment on Cross-link for Flexible Duplex. 3GGP TSG RAN WG1 Meeting 87, R1-1611227—5 pages (Nov. 14-18, 2016).

ZTE et al., "Considerations about symbol boundary alignment", 3GPP TSG RAN WG1 Meeting 86, R1-166491—10 pages (Aug. 22-26, 2016).

First Search Report for CN 201710014036.9.

First Office Action for CN 201710014036.9.

* cited by examiner

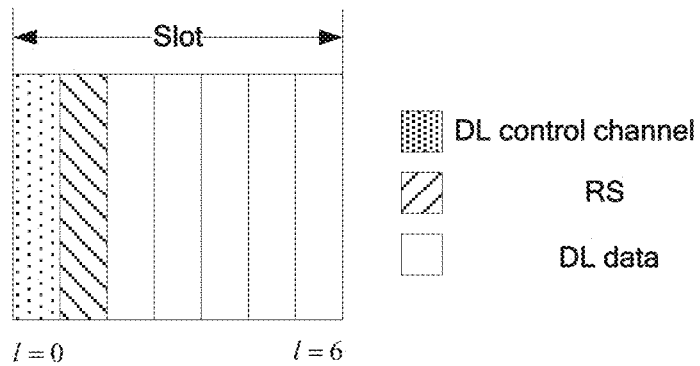
FIG.7-a
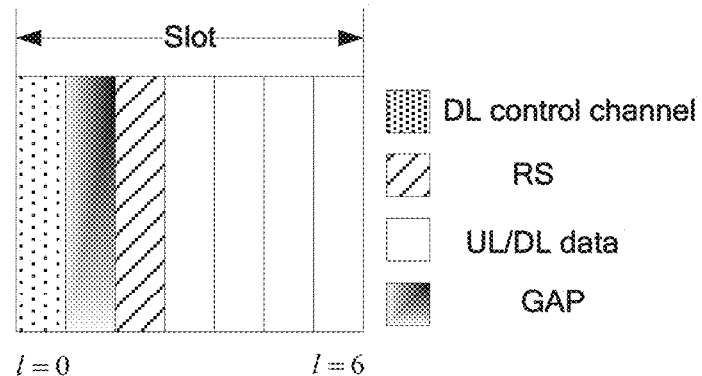
FIG.7-b
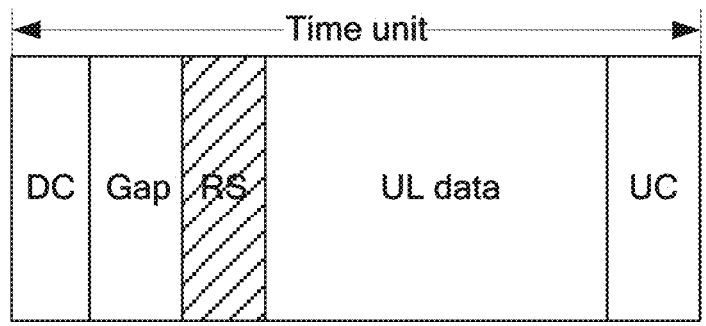
FIG.8

METHOD AND APPARATUS FOR UPLINK AND DOWNLINK TRANSMISSION ALIGNMENT

CROSS-REFERENCE TO RELATED APPLICATIONS

This application is a US national phase application of international patent application No. PCT/CN2018/071979 filed on Jan. 9, 2018, which claims priority to Chinese patent application No. 201710014036.9, entitled "METHOD AND APPARATUS FOR UPLINK AND DOWNLINK TRANSMISSION ALIGNMENT" and filed on Jan. 9, 2017, the disclosure of which is incorporated therein by reference in its entirety.

TECHNICAL FIELD

The present disclosure relates to the field of communications and in particular, a method and apparatus for aligning uplink transmission with downlink transmission.

BACKGROUND

With an increase in new mobile devices, communication services are continuously increasing, network traffic keeps increasing, and existing radio technologies are no longer able to meet the demands of future communication. Compared with previous generations of mobile communication, the fifth generation mobile communication technology (5G) is richer in energy of service supply, and in the face of differentiated performance requirements of diversified scenarios, it is difficult for 5G to form a solution for all scenarios on the basis of a certain single technology as before.

The IMT2020 (5G) propulsion group releases 5G major technical scenarios, key challenges and applicable key technologies. The major application scenarios include: mobile broadband, large-scale technical communication, and ultra-reliable and low-latency communication. 5G does not merely emphasize the peak rate, but comprehensively considers the following technical indicators: peak rate, user experience rate, spectral efficiency, mobility, time latency, connection number density, network energy efficiency, and traffic density. Currently, the establishment of a global unified 5G standard has become a common call in the industry. The international telecommunication union (ITU) developed research on 5G technical performance demands and evaluation methods in 2016, 5G candidate solution collection is started at the end of 2017, and standard establishment is to be completed at the end of 2020. The 3rd Generation Partnership Project (3GPP) will undertake the development of technical content of 5G international standards. Currently, a research on standards of the first phase of the 5G NR is undergone in the 3GPP Rel-14 phase. Among them, an important research topic is duplex communication, or cross-link interference management in a flexible duplex/ dynamic time division duplex (TDD) communication mode. Here, the flexible duplex/dynamic TDD refers to that uplink and downlink transmission resources of each subframe may be dynamically allocated.

In the dynamic TDD/flexible duplex mode, different devices can be flexibly configured with at least one transmission attribute of a resource in the uplink and the downlink, thereby causing the problem of cross-link interference between adjacent devices on the same resource, i.e., the base station-to-base station interference (which may be understood as interference caused by downlink transmission of a base station to uplink reception of an adjacent base station) and the terminal-to-terminal interference (which may be understood as interference caused by uplink transmission of a terminal to downlink reception of an adjacent terminal). The cross-link interference exists not only between uplink and downlink data channels, but also between uplink and downlink reference signals and the data channels.

It is known that a reference signal plays a crucial role in channel estimation and data demodulation, and therefore, if the reference signal is interfered, the error probability of channel estimation is improved to some extent, and the demodulation performance of data is affected. Based on the above matter, a symmetric design of uplink and downlink reference signals should be supported in order to avoid interference on the reference signal.

However, on the premise that the symmetric design of uplink and downlink reference signals is supported, a problem to be solved still remains as described below. At least one of the following is caused: the alignment design of uplink and downlink reference signals is unrealizable; the problem of interference signal interference is unavoidable; and the problem of control channel interference is unavoidable since at least one of the following: the timing relationship between a PDCCH and downlink data is different from the timing relationship between the PDCCH and uplink data; different numerology may be used in the uplink and downlink transmission links; the number of control channel symbols occupied by different devices is different; and the relative timing offset between different devices exceeds duration of the cyclic prefix. FIG. 1 is a schematic diagram illustrating the misalignment of uplink and downlink reference signals in the related art of the present disclosure.

There is no effective solution to at least one of the problems of avoiding interference between uplink and downlink reference signals and avoiding control channel interference.

SUMMARY

Embodiments of the present disclosure provide a method and apparatus for aligning uplink transmission with downlink transmission to at least solve the problem, in the related art, of cross-link interference in a flexible duplex/dynamic TDD transmission mode.

An embodiment of the present disclosure provides a method for aligning uplink transmission with downlink transmission. The method includes at least one of: obtaining a time unit; performing at least one of uplink transmission or downlink transmission on a spectrum resource corresponding to the time unit; or configuring at least one timing advance (TA) adjustment amount over the time unit. Alternatively, an embodiment of the present disclosure provides a method for aligning uplink transmission with downlink transmission. The method includes at least one of: performing at least one of uplink transmission or downlink transmission on a spectrum resource corresponding to a time unit; or configuring at least one TA adjustment amount over the time unit.

Optionally, the time unit is at least one of: an orthogonal frequency division multiplexing (OFDM) symbol, a sub-slot, a slot, a sub-frame, or a specific time interval.

Optionally, the time unit includes one or more sub-time units.

Optionally, the time unit includes a first time unit, the first time unit includes at least one of: a first cyclic prefix, a PDCCH, or a gap.

Optionally, the gap is located in front of the first cyclic prefix and/or behind the PDCCH.

Optionally, the time unit includes a second time unit, the second time unit includes at least one of: a second cyclic prefix, a reference signal, or the gap.

Optionally, during transmission of an uplink reference signal, a first gap is located in front of the second cyclic prefix, and the uplink reference signal is located behind the second cyclic prefix; or the first gap is located behind the uplink reference signal, and the second cyclic prefix is located in front of the uplink reference signal; or the first gap is located behind the uplink reference signal and/or in front of the second cyclic prefix.

Optionally, during transmission of an uplink reference signal, a first gap of the second time unit is located in front of a third cyclic prefix, and the uplink reference signal is located behind the third cyclic prefix; or the first gap is located behind the uplink reference signal, and the third cyclic prefix is located in front of the uplink reference signal; or the first gap is located behind the uplink reference signal and/or in front of the third cyclic prefix.

Optionally, during transmission of a downlink reference signal, the downlink reference signal is located behind the second cyclic prefix, or the downlink reference signal is located behind the second cyclic prefix, and a first gap is located behind the downlink reference signal; or the first gap is located in front of the second cyclic prefix, and the downlink reference signal is located behind the second cyclic prefix; or the first gap is located behind the downlink reference signal and/or in front of the second cyclic prefix.

Optionally, during transmission of a downlink reference signal, the downlink reference signal is located behind a third cyclic prefix; or the first gap is located in front of the third cyclic prefix, and the downlink reference signal is located behind the third cyclic prefix; or a first gap of the second time unit is located in front of the third cyclic prefix, and the downlink reference signal is located behind the third cyclic prefix; or the first gap is located behind the downlink reference signal and/or in front of the third cyclic prefix.

Optionally, the time unit includes a third time unit, the third time unit includes at least one of: the second cyclic prefix, a data unit, or the gap.

Optionally, a relationship among at least one of the second cyclic prefix, the data unit or a second gap includes at least one of: the second cyclic prefix being located in front of the data unit; the second gap being located behind the data unit; or the second gap being located at a beginning or in front of the data unit.

Optionally, a relationship among at least one of the second cyclic prefix, a third gap, the data unit or a second gap includes: the second cyclic prefix being located behind the third gap; the second cyclic prefix being located in front of the data unit; or the second gap being located behind the data unit.

Optionally, a relationship among at least one of the third cyclic prefix, the data unit, or a second gap includes at least one of: the third cyclic prefix being located in front of the data unit or the second gap being located behind the data unit.

Optionally, a relationship among at least one of the third cyclic prefix, a third gap, the data unit, or a second gap includes at least one of: the third cyclic prefix being located behind the third gap; the third cyclic prefix being located in front of the data unit; or the second gap being located behind the data unit.

Optionally, at least one of the second cyclic prefix or the third cyclic prefix is used on at least one subunit of the data unit.

Optionally, the time unit includes a fourth time unit, the fourth time unit includes at least one of: the second cyclic prefix, the gap, a physical uplink control channel (PUCCH), or the uplink reference signal.

Optionally, a relationship among at least one of the second cyclic prefix, a fourth gap, the PUCCH, or a fifth gap includes at least one of: the second cyclic prefix being located behind the fourth gap; the second cyclic prefix being located in front of the PUCCH; or the fifth gap being located behind the PUCCH.

Optionally, during transmission of the downlink reference signal, a relationship among at least one of the third cyclic prefix, a fourth gap, the PUCCH, or a fifth gap includes at least one of: the third cyclic prefix being located behind the fourth gap; the third cyclic prefix being located in front of the PUCCH; or the fifth gap being located behind the PUCCH.

Optionally, during transmission of the uplink reference signal, a relationship among at least one of the second cyclic prefix, the PUCCH, a fifth gap, or a sixth gap includes at least one of: the second cyclic prefix being located in front of the PUCCH; the fifth gap being located behind the PUCCH; the sixth gap being located in front of the second cyclic prefix; or the PUCCH being located behind the second cyclic prefix.

Optionally, during transmission of the uplink reference signal, a relationship among at least one of the third cyclic prefix, the PUCCH, a fifth gap, or a sixth gap includes at least one of: the third cyclic prefix being located in front of the PUCCH; the fifth gap being located behind the PUCCH; the sixth gap being located in front of the third cyclic prefix; or the PUCCH being located behind the third cyclic prefix.

Optionally, the fourth time unit is included in the second time unit.

Optionally, the fourth time unit is located at a front end of the second time unit, or the fourth time unit is located behind the second time unit, or the fourth time unit includes the second time unit.

Optionally, the time unit includes a first cyclic prefix, a second cyclic prefix, and a third cyclic prefix, and a relationship among at least one of duration of the first cyclic prefix, duration of the second cyclic prefix, or duration of the third cyclic prefix includes at least one of: the duration of the first cyclic prefix being longer than the duration of the second cyclic prefix; the duration of the third cyclic prefix being longer than the duration of the first cyclic prefix; or the duration of the third cyclic prefix being longer than the duration of the second cyclic prefix.

Optionally, at least one of the first time unit, the second time unit, the third time unit, or the fourth time unit in the time unit is configured with one or more TA adjustment amounts, or the first time unit, the second time unit, the third time unit, and the fourth time unit in the time unit each are configured with one TA adjustment amount.

Optionally, the TA adjustment amount is used for advancing the adjustment amount forward or delaying the adjustment amount backward.

Optionally, at least one of duration, a starting position or an ending position of at least one of the time unit, the sub-time unit, the first time unit, the second time unit, the third time unit, the fourth time unit, the cyclic prefix, the gap, the reference signal, data, a control channel, or the TA adjustment amount is determined through at least one of: predefinition, physical layer downlink control information (DCI) signaling, or higher-layer radio resource control (RRC) signaling. Optionally, a position of the reference signal in the second time unit is related to at least one of: the number of symbols occupied by the PDCCH, whether a PUCCH is prefixed, a timing relationship relative to the PDCCH, duration of a cyclic prefix located in front of the reference signal, or a relative timing offset amount between different devices.

Optionally, before performing the at least one of the uplink transmission or the downlink transmission on the spectrum resource corresponding to the time unit, the method further includes at least one of: adjusting a position of a gap relative to at least one of a control channel, a data channel or a reference signal in the time unit to align an uplink signal with a downlink signal; adjusting a position of a cyclic prefix located in front of at least one of the control channel, the data channel or the reference signal in the time unit to align the uplink signal with the downlink signal; adjusting the TA adjustment amount of the time unit to align different devices; or adjusting a TA adjustment amount of at least one of a first time unit, a second time unit, a third time unit or a fourth time unit in the time unit to align the different devices, or to align the different devices in at least one time unit.

Optionally, before configuring the at least one TA adjustment amount over the time unit, the method further includes that: a transmission device obtains a timing offset relative to other devices based on measurement, where the transmission device is at least one of a base station or a terminal. Optionally, a measurement quantity for measuring the timing offset relative to the other devices includes at least one of: a radio resource management (RRM) measurement signal, a reference signal receiving power (RSRP) measurement signal or a demodulation reference signal (DMRS) measurement signal.

Optionally, the terminal receives physical downlink shared channel (PDSCH) data sent by the base station to obtain at least one of: a timing offset, timing, or the TA adjustment amount; the terminal receives a preamble before sending of the PDSCH, and obtains, based on preamble measurement, at least one of: the timing offset, the timing, or the TA adjustment amount; the terminal receives at least one of: the timing offset, the timing, or the TA adjustment amount indicated by the base station; or the terminal performs at least one of the following operations on a designated resource configured or reserved by the base station: timing synchronous tracking; or measurement of at least one of: the timing offset, the timing or the TA adjustment amount.

Optionally, the method further includes that: the terminal notifies the base station of at least one of the timing offset, the timing, or the TA adjustment amount.

Another embodiment of the present disclosure provides an apparatus for aligning uplink transmission with downlink transmission. The apparatus includes at least one of: an obtaining module configured to obtain a time unit; or a transmission module configured to perform at least one of following operations: transmitting at least one of an uplink signal or a downlink signal on a spectrum resource corresponding to the time unit; or configuring at least one TA adjustment amount over the time unit.

Optionally, the time unit is at least one of: an OFDM symbol, a sub-slot, a slot, a sub-frame, or a specific time interval.

Optionally, the time unit includes one or more sub-time units.

Optionally, the apparatus further includes at least one of: a first adjustment module configured to adjust a position of a gap relative to at least one of a control channel, a data channel or a reference signal in the time unit to align an uplink signal with a downlink signal before the at least one of the uplink transmission or the downlink transmission is performed on the spectrum resource corresponding to the time unit; or a second adjustment module configured to adjust a position of a cyclic prefix located in front of at least one of the control channel, the data channel or the reference signal in the time unit to align the uplink signal with the downlink signal before the at least one of the uplink transmission or the downlink transmission is performed on the spectrum resource corresponding to the time unit.

Another embodiment of the present disclosure further provides a storage medium. The storage medium is configured to store program codes for performing at least one of following steps:

obtaining a time unit;

transmitting at least one of an uplink signal or a downlink signal on a spectrum resource corresponding to the time unit; and configuring at least one TA adjustment amount over the time unit.

Through at least one of obtaining the time unit, performing the at least one of the uplink transmission or the downlink transmission on the spectrum resource corresponding to the time unit, or configuring the at least one TA adjustment amount over the time unit in the present disclosure, the cross-link interference in the related art in the flexible duplex/dynamic TDD transmission mode, which is caused by at least one of the following is solved: the timing relationship between a PDCCH and downlink data is different from the timing relationship between the PDCCH and uplink data; different numerology may be used in the uplink and downlink transmission links; the numbers of symbols occupied by control channels of different devices are different; and the relative timing offset between different devices exceeds duration of the cyclic prefix. Therefore, the stability of signal transmission of a communication device is improved.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings:

FIG. 7-a is a fourth schematic diagram illustrating a structure of a downlink transmission unit according to the present disclosure;

FIG. 7-b is a fifth schematic diagram illustrating a structure of a downlink transmission unit according to the present disclosure;

FIG. 8 is a schematic diagram illustrating a structure of an uplink-dominated transmission unit according to the present disclosure;

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
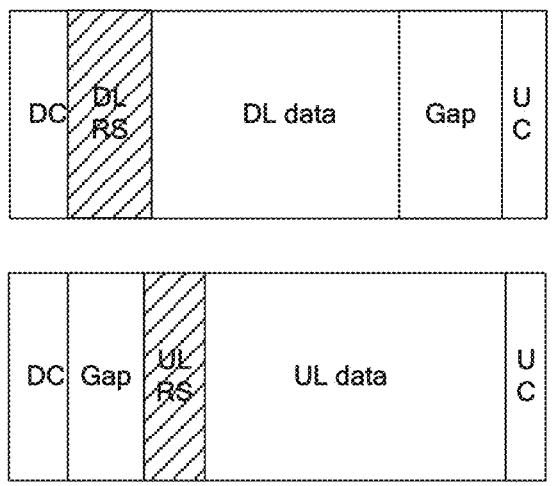
FIG. 1 is a schematic diagram illustrating misalignment of uplink and downlink reference signals in the related art.
Figure 2:
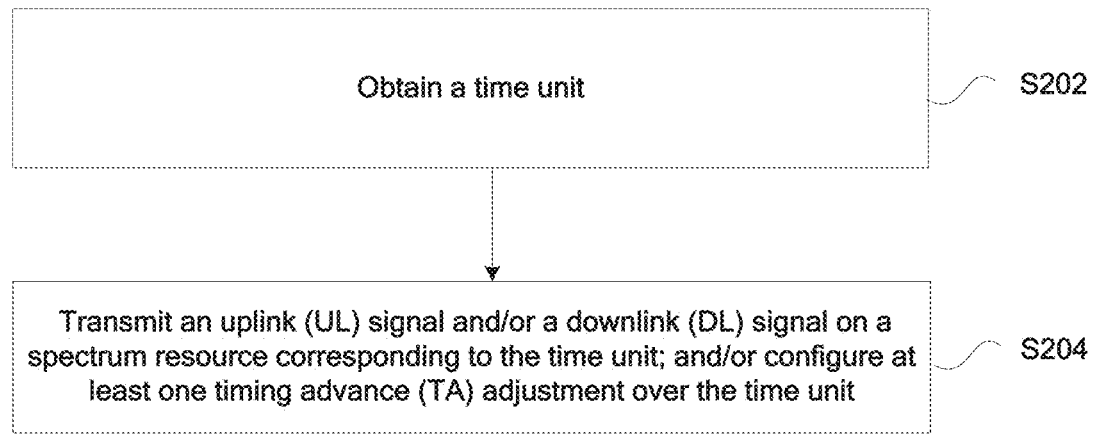
FIG. 2 is a flowchart of a method for aligning uplink transmission with downlink transmission according to an embodiment of the present disclosure.

A method for aligning uplink transmission with downlink transmission is provided in the present embodiment. FIG. 2 is a flowchart of the method for aligning uplink transmission with downlink transmission according to the embodiment of the present disclosure. As shown in FIG. 2, the method includes at least one step described below.

In S202, a time unit is obtained.

In S204, at least one of the following operations is performed: at least one of uplink transmission or downlink transmission is performed on a spectrum resource corresponding to the time unit; or at least one timing advance (TA) adjustment amount is configured over the time unit.

Through at least one step described above in which the time unit is obtained; at least one of the uplink transmission or the downlink transmission is performed on the spectrum resource corresponding to the time unit; and at least one TA adjustment amount is configured over the time unit, the cross-link interference problem caused by at least one of the following reasons in the flexible duplex/dynamic TDD transmission mode in the related art is solved: the timing relationship between a PDCCH and downlink data is different from the timing relationship between the PDCCH and uplink data; different numerology may be used in the uplink and downlink transmission links; the numbers of control channel symbols occupied by different devices are different; and the relative timing offset between different devices exceeds duration of the cyclic prefix. Therefore, the stability of signal transmission of a communication device is improved.

The above steps may be performed by a transmission device, which may be a base station (at least one of a macro base station or a micro base station) and/or a terminal. The transmission device includes different devices (e.g., an LTE device, or an NR device) under the same network, or transmission devices under different networks or different operators or the same operator. Optionally, the different transmission devices may be geographically identical, or different, or synchronized, or not synchronized, but are not limited thereto.

The time unit may be obtained through at least one of: predefinition, physical layer DCI signaling, or higher-layer RRC signaling.

Optionally, before at least one of the uplink transmission or the downlink transmission is performed on the spectrum resource corresponding to the time unit, the method further includes at least one of: adjusting a position of a gap relative to at least one of a control channel, a data channel or a reference signal in the time unit to align an uplink signal with a downlink signal; or adjusting a position of a cyclic prefix located in front of at least one of the control channel, the data channel or the reference signal in the time unit to align the uplink signal with the downlink signal. In the present embodiment, the alignment of uplink and downlink transmission signals/channels of different devices is achieved by: dynamically adjusting the gap before or after at least one of the control channel, the data channel, or the reference signal; and/or dynamically adjusting the cyclic prefix before at least one of the control channel, the data channel, or the reference signal. Of course, the alignment of the uplink signal with the downlink signal may also be achieved in other manners.

Optionally, the time unit is at least one of: an OFDM symbol, a sub-slot, a slot, a sub-frame, or a specific time interval. The time unit may include a control channel, a data channel, a reference signal, a gap, and a cyclic prefix. The gap may be arranged in front of or behind the control channel, the data channel and the reference signal, and the cyclic prefix is arranged in front of the control channel, the data channel and the reference signal. Multiple gaps and multiple cyclic prefixes may be included in a time unit, and when there are multiple gaps or multiple cyclic prefixes, distinction is made in the present embodiment by a first gap, a second gap, a first cyclic prefix, a second cyclic prefix, and the like.

In the present embodiment, the time unit includes one or more sub-time units, and the sub-time units include at least one of: a first time unit, a second time unit, a third time unit or a fourth time unit.

In an optional implementation mode according to the present embodiment, when the time unit includes the first time unit, the first time unit includes: the first cyclic prefix, the PDCCH, and the gap.

Optionally, a relationship among at least one of the gap, the first cyclic prefix, or the PDCCH includes at least one of: the gap being located in front of the first cyclic prefix; or the gap being located behind the PDCCH.

In an optional implementation mode according to the present embodiment, when the time unit includes a second time unit, the second time unit includes at least one of: the second cyclic prefix, the reference signal, or the gap.

Optionally, during transmission of an uplink reference signal, the first gap is located in front of the second cyclic prefix, and the uplink reference signal is located behind the second cyclic prefix; or the first gap is located behind the uplink reference signal, and the second cyclic prefix is located in front of the uplink reference signal; or the first gap is located behind the uplink reference signal and/or in front of the second cyclic prefix.

Optionally, during transmission of the uplink reference signal, a first gap of the second time unit is located in front of a third cyclic prefix, and the uplink reference signal is located behind the third cyclic prefix; or the first gap is located behind the uplink reference signal, and the third cyclic prefix is located in front of the uplink reference signal; or the first gap is located behind the uplink reference signal and/or in front of the third cyclic prefix.

Optionally, during transmission of a downlink reference signal, the downlink reference signal is located behind the second cyclic prefix, or the downlink reference signal is located behind the second cyclic prefix, and the first gap is located behind the downlink reference signal; or the first gap is located in front of the second cyclic prefix, and the downlink reference signal is located behind the second cyclic prefix; or the first gap is located behind the downlink reference signal and/or in front of the second cyclic prefix.

Optionally, during transmission of the downlink reference signal, the downlink reference signal is located behind the third cyclic prefix; or the first gap is located in front of the third cyclic prefix, and the downlink reference signal is located behind the third cyclic prefix; or the first gap of the second time unit is located in front of the third cyclic prefix, and the downlink reference signal is located behind the third cyclic prefix; or the first gap is located behind the downlink reference signal and/or in front of the third cyclic prefix.

In an optional implementation mode according to the present embodiment, when the time unit includes the third time unit, the third time unit includes at least one of: the second cyclic prefix, the data unit, or the gap.

Optionally, a relationship among at least one of the second cyclic prefix, the data unit, or the second gap includes at least one of: the second cyclic prefix being located in front of the data unit or the second gap being located behind the data unit.

Optionally, a relationship among at least one of the second cyclic prefix, a third gap, the data unit or the second gap includes: the second cyclic prefix being located behind the third gap; the second cyclic prefix being located in front of the data unit; or the second gap being located behind the data unit.

Optionally, a relationship among at least one of the third cyclic prefix, the data unit, or the second gap includes at least one of: the third cyclic prefix being located in front of the data unit, or the second gap being located behind, at the beginning of or in front of the data unit.

Optionally, a relationship among at least one of the third cyclic prefix, the third gap, the data unit, or the second gap includes at least one of: the third cyclic prefix being located behind the third gap; the third cyclic prefix being located in front of the data unit; or the second gap being located behind the data unit.

Optionally, at least one of the second cyclic prefix or the third cyclic prefix is used in at least one subunit of the data unit.

In an optional implementation mode according to the present embodiment, when the time unit includes the fourth time unit, the fourth time unit includes at least one of: the second cyclic prefix, the gap, a PUCCH, or the uplink reference signal.

Optionally, a relationship among at least one of the second cyclic prefix, the fourth gap, the PUCCH, the fifth gap, or the sixth gap includes at least one of: the second cyclic prefix being located behind the fourth gap; the second cyclic prefix being located in front of the PUCCH; the fifth gap being located behind the PUCCH; the sixth gap being located in front of the second cyclic prefix; or the PUCCH being located behind the second cyclic prefix.

Optionally, during transmission of the downlink reference signal, a relationship among at least one of the third cyclic prefix, the fourth gap, the PUCCH, the fifth gap, or the sixth gap includes at least one of: the third cyclic prefix being located behind the fourth gap; the third cyclic prefix being located in front of the PUCCH; the fifth gap being located behind the PUCCH; the sixth gap being located in front of the third cyclic prefix; or the PUCCH being located behind the third cyclic prefix.

Optionally, during transmission of the uplink reference signal, a relationship among at least one of the second cyclic prefix, the PUCCH, the fifth gap, the third cyclic prefix or the fifth gap includes at least one of: the second cyclic prefix being located in front of the PUCCH; the fifth gap being located behind the PUCCH; the third cyclic prefix being located in front of the PUCCH; or the fifth gap being located behind the PUCCH.

Optionally, the fourth time unit is included in the second time unit. Optionally, the fourth time unit is located at a front end of the second time unit, or the fourth time unit is located behind the second time unit, or the fourth time unit includes the second time unit.

Optionally, at least one of the first time unit, the second time unit, the third time unit, or the fourth time unit in the time unit is configured with one or more TA adjustment amounts, or the first time unit, the second time unit, the third time unit, and the fourth time unit in the time unit each are configured with one TA adjustment amount.

In the present embodiment, the TA adjustment amount is used for advancing the adjustment amount forward or delaying the adjustment amount backward.

Optionally, the time unit includes the first cyclic prefix, the second cyclic prefix, and the third cyclic prefix, and a relationship among at least one of duration of the first cyclic prefix, duration of the second cyclic prefix, or duration of the third cyclic prefix includes at least one of: the duration of the first cyclic prefix being longer than the duration of the second cyclic prefix; the duration of the third cyclic prefix being longer than the duration of the first cyclic prefix; or the duration of the third cyclic prefix being longer than the duration of the second cyclic prefix.

In the present embodiment, at least one of duration, a starting position or an ending position of at least one of the time unit, the sub-time unit, the first time unit, the second time unit, the third time unit, the fourth time unit, the cyclic prefix, the gap, the reference signal, data, the control channel, or the TA adjustment amount is determined through at least one of: predefinition, physical layer DCI signaling, or higher-layer RRC signaling. The cyclic prefix and the gap are included in the time unit.

Optionally, a position of the reference signal in the second time unit is related to at least one of: the number of symbols occupied by the PDCCH, whether to a PUCCH is prefixed, a timing relationship with the PDCCH, duration of a cyclic prefix located in front of the reference signal, or a relative timing offset amount between different devices.

Optionally, before performing at least one of the uplink transmission or the downlink transmission on the spectrum resource corresponding to the time unit, the method further includes at least one of steps described below.

A position of the gap relative to at least one of the control channel, the data channel or the reference signal is adjusted in the time unit to align an uplink signal with a downlink signal.

A position of a cyclic prefix located in front of at least one of the control channel, the data channel or the reference signal is adjusted in the time unit to align the uplink signal with the downlink signal.

The TA adjustment amount of the time unit is adjusted to align different devices.

The TA adjustment amount of at least one of a first time unit, a second time unit, a third time unit or a fourth time unit in the time unit is adjusted to align the different devices, or to align the different devices in at least one time unit.

Optionally, before the at least one TA adjustment amount is configured over the time unit, the method further includes that: a transmission device obtains a timing offset relative to other devices based on measurement, where the transmission device is at least one of a base station or a terminal.

Optionally, a measurement quantity for measuring the timing offset relative to the other devices includes at least one of: an RRM measurement signal, an RSRP measurement signal or a DMRS measurement signal.

Optionally, the terminal receives PDSCH data sent by the base station to obtain at least one of: the timing offset, the timing, or the TA adjustment amount; the terminal receives a preamble before sending of the PDSCH, and obtains, based on preamble measurement, at least one of: the timing offset, the timing, or the TA adjustment amount; the terminal receives at least one of: the timing offset, the timing, or the TA adjustment amount indicated by the base station; or the terminal performs at least one of the following operations on a designated resource configured or reserved by the base station: timing synchronous tracking; or measurement of at least one of: the timing offset, the timing or the TA adjustment amount.

Optionally, the terminal notifies the base station of at least one of the timing offset, the timing, or the TA adjustment amount for the base station to implement at least one of: alignment adjustment between base stations, alignment adjustment between terminals or alignment adjustment between the base station and the terminal.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solution provided by the present disclosure substantially, or the part contributing to the related art, may be embodied in the form of a software product. The computer software product is stored in a storage medium (such as a read-only memory (ROM)/a random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment 2

An apparatus for aligning uplink transmission with downlink transmission is further provided in the present embodiment. The apparatus is used for implementing the above-mentioned embodiments and preferred implementation modes. What has been described will not be repeated. As used below, the term "module" may be at least one of software, hardware and a combination thereof capable of implementing predetermined functions. The apparatus in the embodiment described below is preferably implemented by software, but implementation by hardware or by a combination of software and hardware is also possible and conceived.

Figure 3:
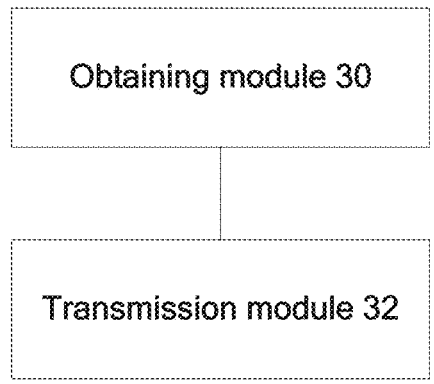
FIG. 3 is a structural block diagram illustrating an apparatus for aligning uplink transmission with downlink transmission according to an embodiment of the present disclosure.

FIG. 3 is a structural block diagram illustrating an apparatus for aligning uplink transmission with downlink transmission according to the embodiment of the present disclosure. As shown in FIG. 3, the apparatus includes at least one of: an obtaining module 30 and a transmission module 32.

The obtaining module 30 is configured to obtain a time unit.

The transmission module 32 is configured to perform at least one of the following operations: performing at least one of uplink transmission or downlink transmission on a spectrum resource corresponding to the time unit; or configuring at least one TA adjustment amount over the time unit.

Optionally, the time unit is at least one of: an OFDM symbol, a sub-slot, a slot, a sub-frame, or a specific time interval. The time unit includes one or more sub-time units.

Optionally, the apparatus further includes at least one of: a first adjustment module, configured to adjust a position of a gap relative to at least one of a control channel, a data channel or a reference signal in the time unit to align an uplink signal with a downlink signal before at least one of the uplink transmission or the downlink transmission is performed by the transmission module on the spectrum resource corresponding to the time unit; or a second adjustment module, configured to adjust a position of a cyclic prefix located in front of at least one of the control channel, the data channel or the reference signal in the time unit to align the uplink signal with the downlink signal before at least one of the uplink transmission or the downlink transmission is performed by the transmission module on the spectrum resource corresponding to the time unit.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 3

A method for aligning uplink transmission with downlink transmission is provided in the present embodiment, and may be used to solve non-synchronization/transmission misalignment between adjacent cells/devices, including: non-synchronization/transmission misalignment of reference signals between different cells/devices and/or non-synchronization/transmission misalignment of data between different cells/devices.

The execution subject, a transmission device, in the present embodiment may be at least one of a base station (at least one of a macro base station or a micro base station) or a terminal. The transmission device includes different devices (e.g., an LTE device, or an NR device) under the same network, or transmission devices under different networks or different operators or the same operator. Optionally, the different transmission devices may be geographically identical, or different, or synchronized, or not synchronized.

The spectrum in which the transmission device operates may be at least one of: paired spectrum, unpaired spectrum, licensed spectrum, unlicensed spectrum, or shared spectrum.

The numerology of the time unit includes at least one of: Subcarrier spacing (SCS), the number of Orthogonal Frequency Division Multiplexing (OFDM) symbols, a length of a Cyclic Prefix (CP), the granularity of frequency domain resources, the number of frequency domain resources, or a length of the gap.

A reference signal includes: a downlink reference signal and an uplink reference signal, for example, a cell specific reference signal (CRS), a Demodulation Reference Signal (DMRS), a channel state information reference signal (CSI-RS), channel state information interference measurement (CSI-IM), a zero power demodulation reference signal (ZP-DMRS), a zero power channel state information reference signal (ZP-CSI-RS), a sounding reference signal (SRS), a zero power sounding reference signal (ZP-SRS), or a zero power or non-zero power newly defined reference/measurement signal.

Physical layer DCI signaling includes at least one of DCI format 0, DCI format 0A, DCI format 0B, DCI format 1, DCI format 1A, DCI format 1B, DCI format 1C, DCI format 1D, DCI format 2, DCI format 2A, DCI format 2B, DCI format 2C, DCI format 2D, DCI format 3, DCI format 3A, DCI format 4, DCI format 4A, or DCI format 4B.

In LTE, a basic transmission unit is a subframe. In NR, the basic transmission unit may be a slot and/or a subframe. One subframe may be formed by N slots, and one slot may be formed by M OFDM symbols. N and M are each a positive integer not less than 1.

The number of OFDM symbols included in each slot may be determined in at least one of the following manners: predefinition, indication through physical layer DCI signaling, configuration through higher-layer RRC signaling, determination according to a correspondence between the subcarrier spacing and the number of symbols, or a combination thereof.

The correspondence between the subcarrier spacing and the number of symbols in a slot may be predefined, or notified through the physical layer DCI signaling, or configured through the higher-layer radio resource control (RRC) signaling. For example, when a subcarrier spacing is of 15 kHz, there are 6, or, 7, or, 8 symbols in a slot, and when a subcarrier spacing is of 60 kHz, there are 6 or 7 symbols in a slot.

The present embodiment further provides multiple instances for describing the present application in detail with reference to specific scenarios.

Instance 1

The present instance describes how to configure a time domain position of a reference signal in a time unit.

The position of the reference signal may be determined through: predefinition, higher-layer RRC signaling, or physical layer DCI signaling. Optionally, the reference signal may follow the principle of at least one of being prefixed, infixed or postfixed. Being prefixed means that the reference signal(s) is(are) located at one or more symbols at the beginning of the data transmission. Bing infixed means that the reference signal(s) is(are) located at one or more symbols in the middle of the data transmission. Being postfixed means that the reference signal(s) is(are) located at one or more symbols at the end of the data transmission.

Figure 4:
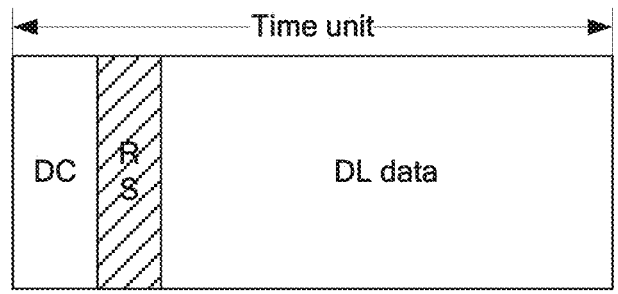
FIG. 4 is a first schematic diagram illustrating a structure of a downlink transmission unit according to the present disclosure.

The reference signal should comply with the prefixed principle in view of requirements for processing delay and/or link interference in the dynamic TDD/flexible duplex mode. Specifically, in a structure of a downlink transmission unit, the reference signal follows a prefixed design as shown in FIG. 4. FIG. 4 is a first schematic diagram illustrating the structure of the downlink transmission unit according to the present disclosure (note: only the position of the reference signal is schematically illustrated here, while the specific position of the reference signal when multiple symbols are included in a transmission unit is not illustrated).

The time unit shown in FIG. 4 may also be referred to as the transmission unit. The time unit or the transmission unit may take a slot as a basic unit, or may take a subframe as the basic unit.

Figure 5:
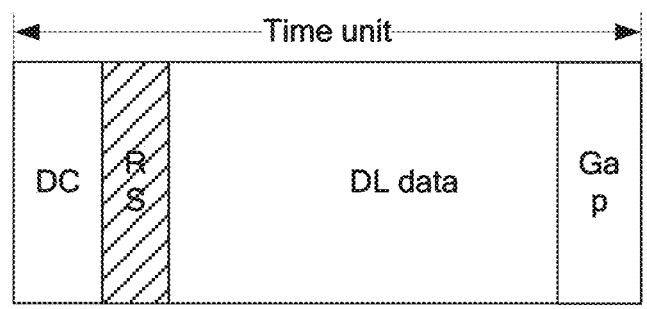
FIG. 5 is a second schematic diagram illustrating a structure of a downlink transmission unit according to the present disclosure.
Figure 6:
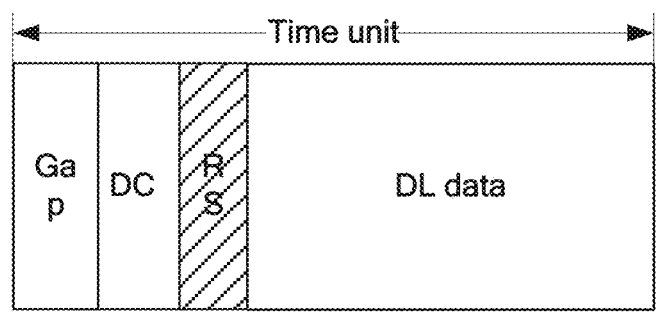
FIG. 6 is a third schematic diagram illustrating a structure of a downlink transmission unit according to the present disclosure.

For unlicensed spectrum, the device needs to perform clear channel assessment (CCA) detection before transmission. To meet such demand, a gap is introduced into the time unit of FIG. 4, and the transmission structure of the time unit thereof is shown in FIG. 5, which is a second schematic diagram illustrating a structure of a downlink transmission unit according to the present disclosure. As shown in FIG. 5, the gap is located at the end of the time unit, and is used for performing at least one of channel sensing, interference measurement, uplink and downlink transition time, or the like before transmission of the next time unit. Optionally, a gap is introduced into the time unit of FIG. 4, and the transmission structure of the time unit thereof is shown in FIG. 6, which is a third schematic diagram illustrating a structure of a downlink transmission unit according to the present disclosure. As shown in FIG. 6, the gap is located at the beginning of the time unit and is used for performing at least one of the channel sensing, the interference measurement, the uplink and downlink transition time, or the like before the transmission of the next time unit.

As can be seen from FIGS. 4 and 5, the reference signal is located behind the PDCCH, and the time domain position of the reference signal is related to at least one of the number of symbols occupied by the PDCCH or the position of the symbol occupied by the PDCCH. For example, the PDCCH occupies one OFDM symbol, and the reference signal occupies symbols starting from the second symbol. The specific number of symbols occupied by the reference signal and the time length of the occupied symbols may be determined by predefinition or the structure of the time unit, may be indicated by physical layer DCI signaling or higher-layer RRC signaling, or may be determined by the number of symbols occupied by the control or the end position of the symbol occupied by the control, or the like. Specifically, by taking the transmission structure in FIG. 4 as an example, a possible position of the reference signal is as shown in FIG. 7-a. FIG. 7-a is a fourth schematic diagram illustrating a structure of a downlink transmission unit according to the present disclosure. When the PDCCH occupies one symbol, the reference signal (RS) occupies the second symbol, and the remaining symbols in one slot are used for data transmission. Optionally, the last symbol in the slot or a portion of the duration in the last symbol is used as the gap and not used for data transmission.

FIG. 7-b is a fifth schematic diagram illustrating a structure of a downlink transmission unit according to the present disclosure. As shown in FIG. 7-b, when the PDCCH occupies one symbol, the reference signal occupies the third symbol, and data is sent from the fourth symbol to the end of the time slot. Optionally, the last symbol in the slot or a portion of the duration in the last symbol is used as the gap and not for data transmission. Optionally, the second symbol may be reserved as the gap, or used for data transmission, or used for at least one of transmission or detection of a sensing signal of interference measurement, or used for information interaction/coordination between different devices, or used for feedback information transmission, or used for control signaling transmission or beam scanning.

Further, when the control channel occupies two symbols, similar to those shown in FIGS. 7-a and 7-b, the reference signal may be located at the third symbol, or the fourth symbol, or the like. Optionally, for FIG. 7-b, the position of the reference signal may be further determined according to the duration of the gap.

As for FIG. 6, the position of the reference signal is also located behind the PDCCH, while the time domain position of the reference signal is related to not only at least one of the number of symbols occupied by the PDCCH or the position of the PDCCH, but also the position of the gap and the length of time occupied by the gap (or length/number of symbols). For example, when the gap occupies the first symbol and the PDCCH occupies the second symbol, the RS may occupy the third symbol.

Optionally, the RS may occupy one, or one or more continuous symbol resources behind the PDCCH.

A downlink-dominated transmission structure is not described herein in the present instance, and differs from the structure of the downlink transmission unit in at least one of the following: the time unit includes an uplink control unit, and a gap unit is introduced between downlink data and a PUCCH.

In an uplink transmission-dominated transmission structure, the reference signal follows a prefixed design, and a typical transmission structure is as shown in FIG. 8. FIG. 8 is a schematic diagram illustrating a structure of an uplink-dominated transmission unit according to the present disclosure. (Note: Only the position of the reference signal is schematically illustrated here, while the specific position of the reference signal when multiple symbols are included in a transmission unit is not illustrated).

Similar to the downlink transmission structure, the uplink transmission-dominated transmission structure follows the prefixed principle of the RS. The position of the RS is determined by at least one of the position of the PDCCH, the number of symbols occupied by the PDCCH, the duration of the gap, the number of symbols occupied by the gap, a value of a timing relationship between the PDCCH and the uplink data, numerology or the like. Optionally, the PDCCH or the PUCCH generally occupies one symbol or two symbols. The duration of the GAP may be configured with physical layer DCI signaling, or predefined, or configured with higher-layer RRC. The RS may occupy one or two, or one or more symbols within a time window, etc. The time unit includes not less than 1 symbol, for example, 1, or, 2, or, 3, or, 4, or, 5, or, 6, or, 7, or, 8, or, 9, or, 10, or, 11, or, 12, or, 13, or, 14, or, 15, or, 16, or, 17, or, 18 symbols.

Optionally, a GAP may be introduced in front of the PUCCH in FIG. 8, and is used for a device only sending control information to perform a sensing operation. Or, the PUCCH is placed behind the GAP in the transmission structure of the time unit in FIG. 8. Optionally, the PUCCH may be placed in front of or behind the RS, or may include the RS. (Alignment of uplink transmission with downlink transmission in this case is considered)

In consideration of the link interference measurement in dynamic TDD/flexible duplex in view of requirement for processing delay, the RS may also follow the infixed principle or the postfixed principle other than the prefixed principle. Under the design principle, long-time interference measurement may be performed to obtain interference measurement information in a statistical sense, and subsequent transmission or scheduling strategies are adjusted based on the statistical interference measurement condition.

Instance 2

A method for implementing alignment/synchronization of uplink and downlink RSs is provided in the present instance. It is assumed that the same numerology (e.g., the same subcarrier spacing) is adopted by different devices. Since the timing relationship between the PDCCH and the uplink/downlink transmission is different in different devices, cross-link interference (CLI) occurs when transmission in opposite link directions are performed by these devices within the same time unit.

Further, the prefixed design of the reference signal, such as a DMRS, is preferably in consideration of at least one of requirements for processing delay or cross-link interference under flexible duplex/dynamic TDD. The advantage is that channel estimation may be performed in advance so that at least one of the following can be achieved or obtained: the decoding success rate is improved; sufficient time is given to decode data; measurement interference condition is obtained; a cross-link interference level is obtained; a transmission link direction is obtained, or the like.

In summary, considering different timings of uplink transmission and downlink transmission as well as the RS prefixed principle, at least one of RS interference or data channel interference may occur. Here, the RS interference refers to cross-link interference generated, on a resource for sending the RS, by an adjacent device transmitting data. The data channel interference refers to cross-link interference generated due to different transmission directions of different devices on the same resource. The RS is interfered, so that the channel estimation accuracy is greatly reduced to a certain extent.

The method for specifically implementing alignment of the uplink RS with the downlink RS can be analyzed and solved with respect to different conditions. It is assumed that base station 1 and base station 2 are adjacent, base station 1 serves subordinate terminal 1, base station 2 serves subordinate terminal 2, and terminal 1 and terminal 2 are adjacent. Downlink transmission is performed between base station 1 and terminal 1, and uplink transmission is performed between base station 2 and terminal 2.

Figure 9:
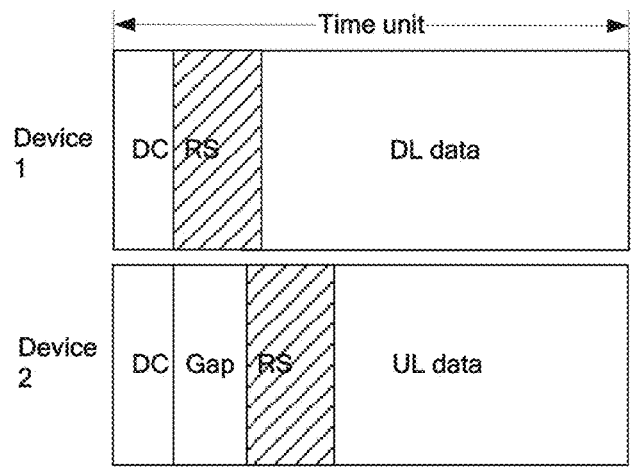
FIG. 9 is a schematic transmission diagram when physical downlink control channels of different devices are aligned according to the present disclosure.

The present instance is directed to a situation where PDCCHs of different devices are aligned with each other. In this situation, interference on the RS symbol is shown in FIG. 9. FIG. 9 is a schematic transmission diagram when PDCCHs of different devices are aligned according to the present disclosure. For downlink transmission of the base station 1, the value of the timing relationship between the PDCCH and the downlink transmission is not less than 0. Preferably, the timing relationship between the PDCCH and the uplink transmission is 1. Here, the basic unit of the value of the timing relationship may be a symbol, or a slot, or a subframe, or a mini-slot, or the like. In combination of the downlink RS prefixed principle, the downlink RS is configured to be transmitted on the second symbol, and downlink data is transmitted on the remaining symbols. At this time, among the remaining symbols, the last symbol may be used for placing the PUCCH, and all or part of the penultimate symbol is used as at least one of the gaps.

For uplink reception by the base station 2, a time gap exists between the PDCCH and the uplink transmission. Optionally, a starting position of the uplink transmission may be considered to be a symbol boundary or a certain time moment within a symbol in addition to a subframe boundary and a slot boundary. In combination with the prefixed principle of the uplink RS, in condition that a length of the gap between the PDCCH and the uplink transmission is less than a length of one symbol, the uplink transmission may start in two cases described below.

Case 1: The uplink transmission starts from a certain time within the symbol.

Figure 10:
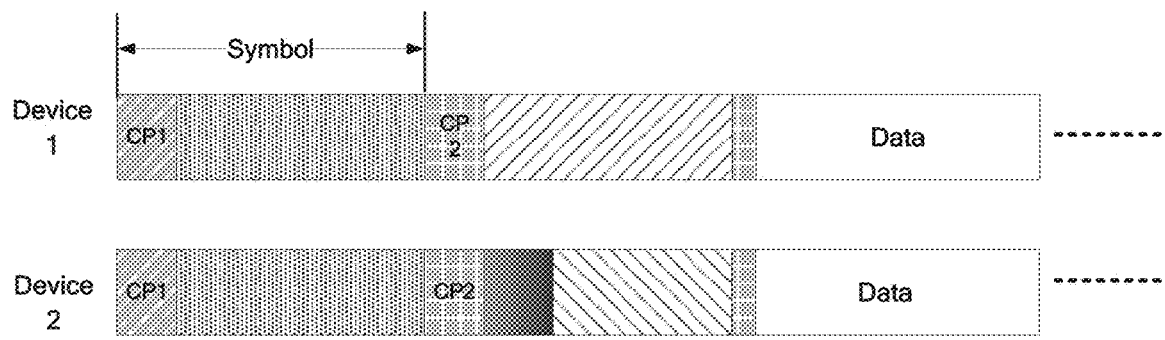
FIG. 10 is a first schematic diagram illustrating a structure of a transmission unit according to instance 2 of the present disclosure.

In consideration of the normalization influence degree, the uplink RS or the sensing/sounding signal or the like may be sent on the remaining resources in the symbol where the gap is located, and the transmission of data is started from the boundary of a complete symbol. FIG. 10 is a first schematic diagram illustrating a structure of a transmission unit according to instance 2 of the present disclosure. As shown in FIG. 10, a control channel occupies the first symbol, a downlink RS occupies the second symbol. In an uplink, since a gap is introduced behind the PDCCH and duration of the GAP is less than duration of a symbol, the uplink RS may be sent on the remaining duration except the gap in the second symbol. The uplink and downlink transmission of different devices start from the third symbol.

At this time, if the relative timing offset between the devices does not exceed duration of a CP, the uplink and downlink reference signals are not interfered, as shown in FIG. 10.

Optionally, in order to implement the symmetric design of uplink/downlink RSs, the uplink/downlink RSs may be designed to be sent on the same time domain resource, and the orthogonality may be implemented in the frequency domain through at least one of frequency division multiplexing (FDM) or an orthogonal cover code (OCC). The uplink/downlink RSs may use a Zadoff-Chu (ZC) sequence, or an M sequence, or the like.

Optionally, in order to implement the above-mentioned symmetric design, at least one of the following manners may be adopted.

Figure 11:
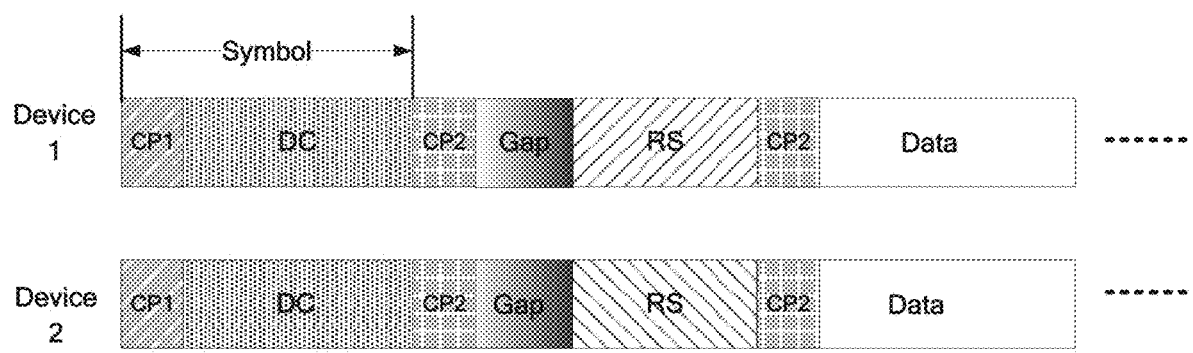
FIG. 11 is a second schematic diagram illustrating a structure of a transmission unit according to instance 2 of the present disclosure.

Manner 1: A gap is introduced in the downlink transmission structure. For example, the gap is located between the PDCCH and the downlink transmission/downlink reference signal, as shown in FIG. 11. FIG. 11 is a second schematic diagram illustrating a structure of a transmission unit according to instance 2 of the present disclosure.

Manner 2: The timing relationship between the PDCCH and the downlink transmission is modified. Preferably, in order to avoid interference on the reference signal symbols, in case of the prefixed reference signal, the same timing relationship may be used in the uplink transmission and the downlink transmission.

Manner 3: An offset value is introduced between the PDCCH and the downlink transmission, on one hand, to implement alignment of uplink/downlink RSs, and on the other hand, to avoid interference in at least one of the RS, the data channel or the control channel caused by the fact that a value of the timing difference between different devices exceeds a CP range.

Figure 12:
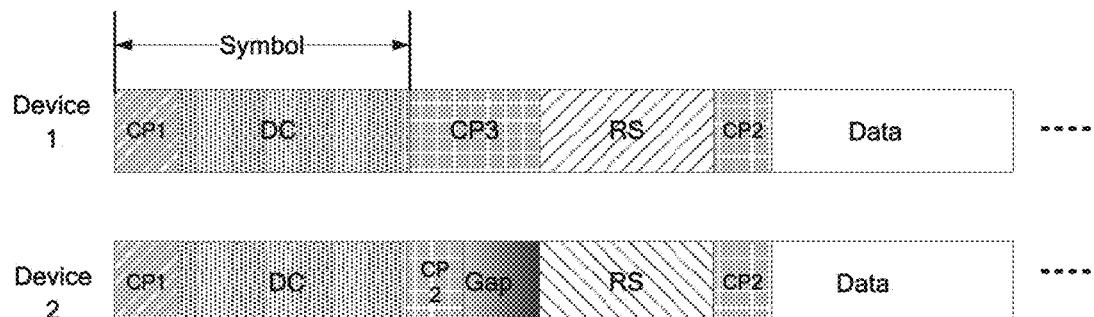
FIG. 12 is a third schematic diagram illustrating a structure of a transmission unit according to instance 2 of the present disclosure.

Manner 4: An extra CP is introduced. FIG. 12 is a third schematic diagram illustrating a structure of a transmission unit according to instance 2 of the present disclosure. As shown in FIG. 12, the length of the uplink/downlink RS and the length of the CP within one symbol are dynamically adjusted so that at least one of RS interference or data channel interference is avoided or reduced to a certain extent. A length of the extra CP may be related to, e.g., be the same as, a gap between the PDCCH and the uplink transmission, or the (prefixed) uplink specific signal (e.g., DMRS, SRS, etc.).

Optionally, the length of the extra CP, or the offset value introduced between the PDCCH and the downlink transmission, or the timing relationship between the PDCCH and the downlink transmission may be determined in at least one of the following manners: predefinition, configuration through higher-layer RRC signaling or physical layer DCI signaling, or determination in an implicit manner. The implicit manner includes implicit obtaining through a gap between the PDCCH and the uplink transmission, or the (prefixed) uplink specific signal (e.g., DMRS, SRS, etc.).

The position of the uplink/downlink reference signal, or the length of the extra CP, or the offset value introduced between the PDCCH and the downlink transmission, or the timing relationship between the PDCCH and the downlink transmission may be cell specific, share/common specific, or UE specific. The first two are preferred.

Manner 5: For the downlink transmission structure, a specific sparse signal is sent after the PDCCH and before the downlink transmission.

Preferably, a time domain length of the sparse signal may be related to, e.g., be the same as, the gap between the PDCCH and the uplink transmission, or the (prefixed) uplink specific signal (e.g., DMRS, SRS, etc.). The sparse signal may be sent merely at specific REs in the frequency domain. A pattern of the sparse signal in the frequency domain may take into account one of the following: the pattern in the frequency domain may be data resources, or a part of the data resources, or reference signal resources, or a part of the reference signal resources, or specific resources. For example, the data resources are resource block (RB) #0, RB #2, and RB #4, and the pattern of the sparse signal in the frequency domain may be a position of the data resources, or a part of resources at the position of the data resources, such as RB #0 and RB #4, or a specific RB/resource element (RE)/resource block group (RBG)/subband on the transmission bandwidth. The pattern may occupy all REs or a specific RE on an RB, for example, may be determined by at least one of a starting RE, an offset amount, a gap, or a length of consecutive REs.

The pattern of the sparse signal in the frequency domain or the parameter (e.g., at least one of the starting RE, the offset amount, the gap, or the length of consecutive REs) for obtaining the pattern in the frequency domain may be determined by at least one of: predefinition, configuration through higher-layer RRC signaling, or physical layer DCI signaling.

For the manner 5, the advantage is that the sparse signal is merely introduced into the downlink transmission structure, which facilitates the uplink device to perform sensing or interference measurement at an uplink gap position. A disadvantage is that reference signal interference, control channel interference, or the like may occur if the timing offset between different devices exceeds the length of a CP.

Manner 6: For the downlink transmission structure, data is sent in a time domain after the PDCCH and before the downlink transmission. Preferably, specific REs on the data resource are vacant. The vacant REs are used for a probing device to perform link direction identification or interference intensity level evaluation.

The specific REs or patterns that are vacant may be determined by at least one of: predefinition, configuration through higher-layer RRC signaling, or physical layer DCI signaling.

Figure 13:
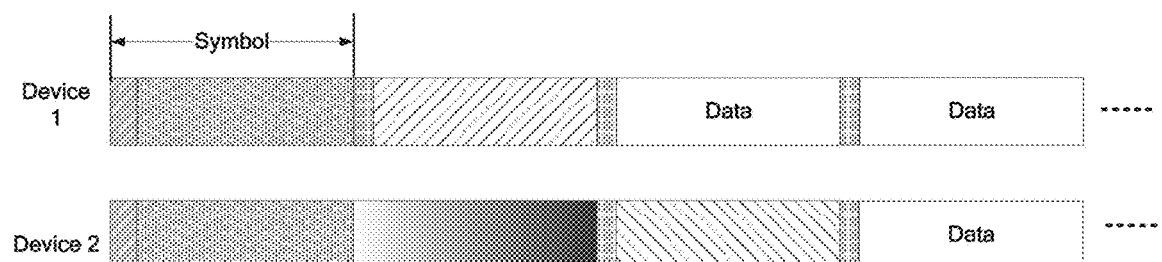
FIG. 13 is a fourth schematic diagram illustrating a structure of a transmission unit according to instance 2 of the present disclosure.

Case 2: The uplink transmission starts from the boundary of a symbol. In this case, since a gap is introduced between the PDCCH, and the uplink transmission starts from the boundary of a symbol and/or the reference signal is prefixed, so the uplink reference signal is transmitted on the third symbol. At this time, uplink reference signals are misaligned, and interference of data sent by the adjacent device is received on the reference signal symbol, as shown in FIG. 13. FIG. 13 is a fourth schematic diagram illustrating a structure of a transmission unit according to instance 2 of the present disclosure.

To avoid reference signal interference, at least one of the following solutions may be adopted. Solution 1: For the downlink transmission structure, a DL gap is introduced. The DL gap is located between the PDCCH and the downlink data/downlink reference signal.

In this way, resource waste is caused and the spectrum efficiency is reduced to a certain extent. The advantage is that interference between symbols is reduced.

Figure 14:
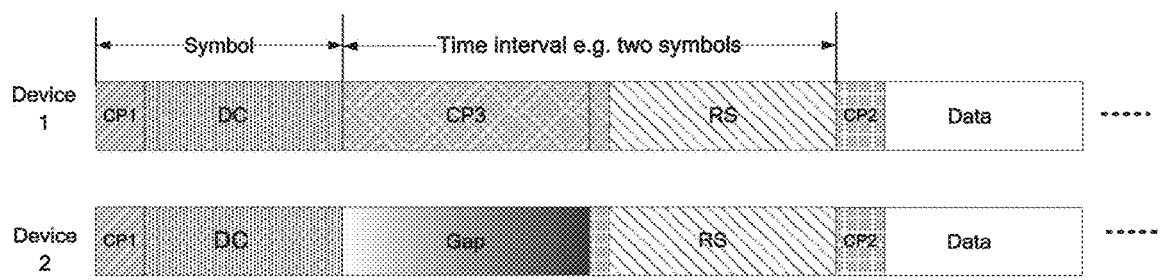
FIG. 14 is a fifth schematic diagram illustrating a structure of a transmission unit according to instance 2 of the present disclosure.

Solution 2: An extra CP is introduced. That is, the durations of the CP and the reference signal are flexibly configured in a time interval. FIG. 14 is a fifth schematic diagram illustrating a structure of a transmission unit according to instance 2 of the present disclosure, as shown in FIG. 14. The extra CP is used to achieve alignment of uplink/downlink reference signals in the time domain or to avoid reference signal interference. The length of the extra CP may be determined by at least one of predefinition, configuration through higher-layer RRC signaling, or physical layer DCI signaling, or is related to at least one of the timing relationship/gap between the PDCCH and the uplink transmission or lengths of CPs on other symbols. Preferably, the length of the extra CP is equal to the sum of a gap (e.g., the timing relationship/gap between the PDCCH and the uplink transmission) and a CP (e.g., a CP of the front segment of a symbol, e.g., lengths of the normal CP, the extended CP, and various CPs specified in the NR).

Manner 3: The timing relationship between the PDCCH and the downlink transmission is modified. Preferably, in order to avoid interference on the reference signal symbols, in the case of the prefixed reference signal, the same timing relationship may be used in the uplink transmission and the downlink transmission.

Manner 4: An offset is introduced in the downlink transmission structure. The offset is a value of an offset between the PDCCH and the downlink transmission. The offset may be determined by at least one of predefinition, configuration through higher-layer RRC signaling, or physical layer DCI signaling, or may be determined according to the timing relationship/gap between the PDCCH and the uplink transmission.

Manner 5: In the time interval between the PDCCH and the starting of uplink or downlink transmission, any combination of a dynamic gap, a CP, a reference signal or a sensing/measuring signal is introduced.

Figure 15:
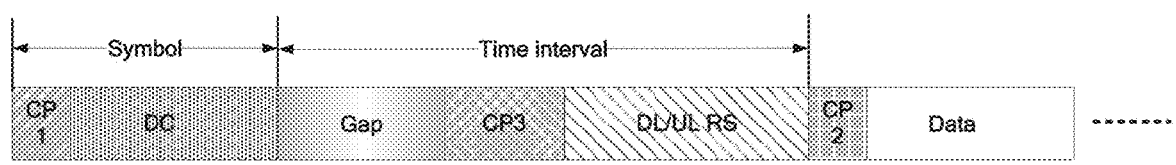
FIG. 15 is a sixth schematic diagram illustrating a structure of a transmission unit according to instance 2 of the present disclosure.

FIG. 15 is a sixth schematic diagram illustrating a structure of a transmission unit according to instance 2 of the present disclosure. As shown in FIG. 15, in one time interval, the transmission unit is formed by a gap, a CP3 and a DL/UL RS. The length of the gap may be determined according to the timing relationship/spacing between the PDCCH and the uplink transmission, or may be predefined, or may be determined through physical layer DCI signaling or higher-layer RRC signaling. The introduction of the gap can not only avoid or reduce interference between symbols or reference signal interference between different devices. The introduction of the CP3 reduces or avoids to a certain extent cross-link interference caused by a timing offset between different devices.

Figure 16:
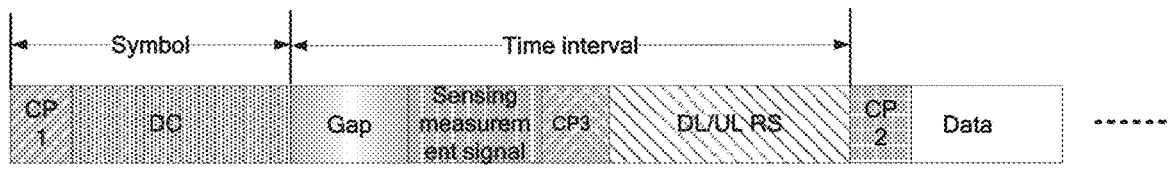
FIG. 16 is a seventh schematic diagram illustrating a structure of a transmission unit according to instance 2 of the present disclosure.

FIG. 16 is a seventh schematic diagram illustrating a structure of a transmission unit according to instance 2 of the present disclosure. As shown in FIG. 16, in one time interval, the transmission unit is formed by a gap, a sensing signal, a CP3 and a DL/UL RS. The difference between the structure and the structures described above is that a sensing/measurement signal unit is introduced. The transmission device transmits a sensing/measurement signal in the sensing/measurement signal unit so that other devices surrounding the transmission device perform interference/measurement, and the measurement device may perform interference measurement on the resource. In addition, waste of resources can be reduced. At least one of the sensing/measurement signal or the DL/UL RS use different subcarrier spacings or the same subcarrier spacing. Optionally, at least one of the sensing/measurement signal or the DL/UL RS in the time interval and the data use different subcarrier spacings or the same subcarrier spacing.

Optionally, a gap, or a CP, or a guard time (GT) may be introduced behind the DL/UL RS.

For the case where the length of the gap between the PDCCH and the uplink transmission is not less than the length of one symbol, the method for aligning uplink/downlink reference signals may be the same as the method used in the case 2 (that is, the case where the uplink transmission starts from the boundary of a symbol).

Instance 3

The present instance provides a solution to misalignment/interference of reference signals when the timing offset between different devices exceeds the length of a CP.

Figure 17:
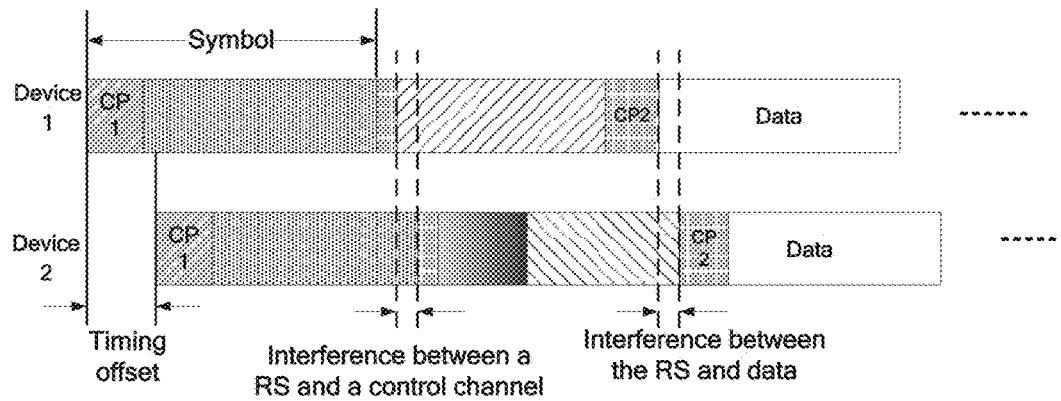
FIG. 17 is a schematic transmission diagram when a timing offset between different devices exceeds a cyclic prefix (CP) length according to instance 3 of the present disclosure.

For the case where the relative timing offset between devices exceeds the length of the CP, FIG. 17 is a schematic transmission diagram when the timing offset between different devices exceeds the CP length according to instance 3 of the present disclosure. As shown in FIG. 17, interference between the reference signal and the control channel as well as interference between the reference signal and the data channel may occur. FIG. 17 illustrates that the gap between the PDCCH and the uplink reference signal is less than the duration of one symbol. The method provided in the present instance is also applicable to the case where the UL gap is not less than the duration of one symbol, and the like.

Figure 18:
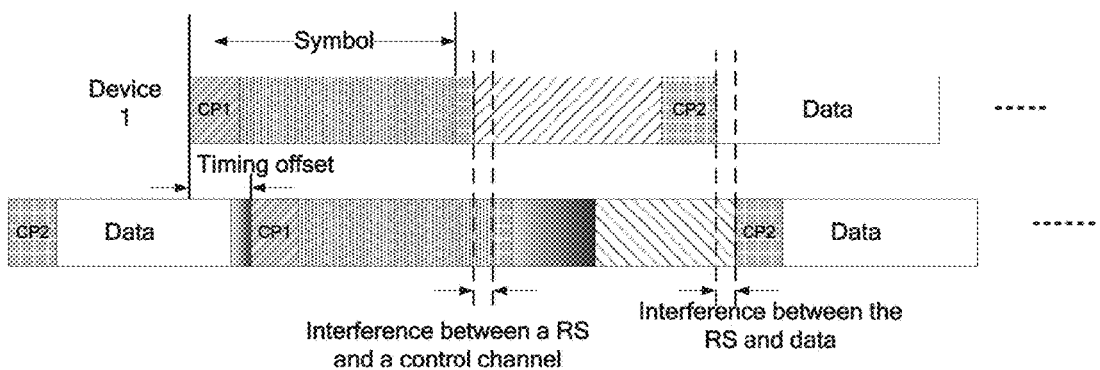
FIG. 18 is a first schematic diagram illustrating a structure of a transmission unit according to instance 3 of the present disclosure.

As shown in FIG. 17, device 2 performs uplink transmission and the timing offset between device 2 and device 1 exceeds the length of a CP1, where device 2 is delayed by a time interval relative to device 1. If data or the PUCCH is transmitted on a previous transmission unit, interference between the PDCCH and the data channel or interference between the PDCCH and the PUCCH may occur. Thus, a gap may be introduced at the end of the transmission structure for avoiding or reducing interference between the data channel and the control channel between different devices. Alternatively, the sparse signal is sent at the end of the transmission structure. In such a manner, the interference to the PDCCH may be reduced to a certain extent. Alternatively, a PUCCH is sent at the end of the transmission structure, where the PUCCH and the PDCCH adopt an orthogonal design in the frequency domain, thereby avoiding interference between physical uplink control channel and physical downlink control channel. FIG. 18 is a first schematic diagram illustrating a structure of a transmission unit according to instance 3 of the present disclosure, and as shown in FIG. 18, interference between a data/physical uplink control channel and the PDCCH can be reduced.

Figure 19:
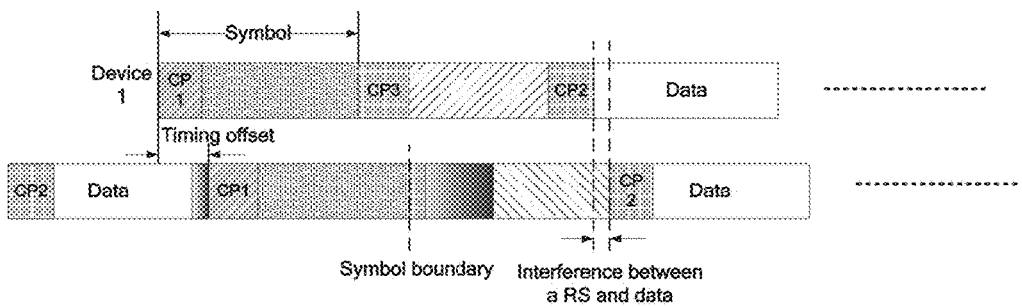
FIG. 19 is a second schematic diagram illustrating a structure of a transmission unit according to instance 3 of the present disclosure.
Figure 20:
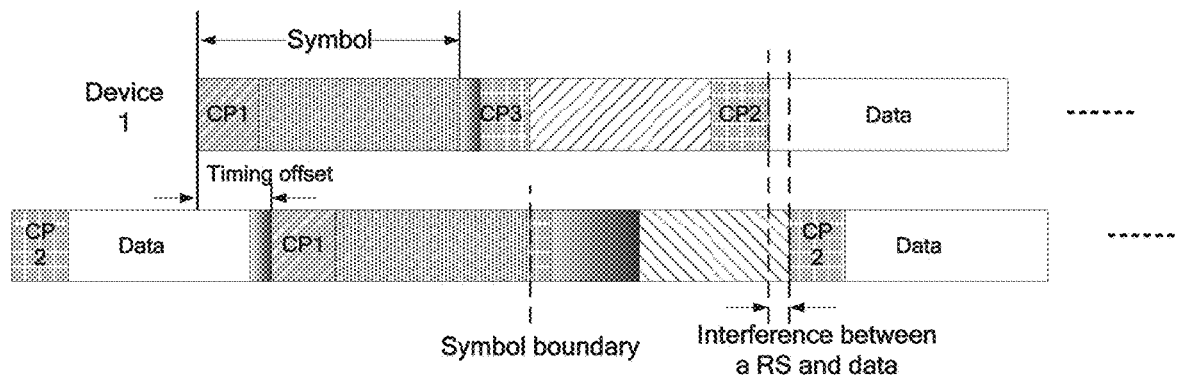
FIG. 20 is a third schematic diagram illustrating a structure of a transmission unit according to instance 3 of the present disclosure.

FIG. 19 is a second schematic diagram illustrating a structure of a transmission unit according to instance 3 of the present disclosure. As shown in FIG. 19, since the timing offset between device 2 and device 1 exceeds the length of CP1, the PDCCH of device 2 interferes with the reference signal or the data channel of device 1. A specific CP is introduced in a reference signal symbol of device 1 (as shown in FIG. 19) or a specific gap is introduced in a reference signal symbol of device 1 (as shown in FIG. 20). FIG. 20 is a third schematic diagram illustrating a structure of a transmission unit according to instance 3 of the present disclosure. As shown in FIG. 20, a length of a CP located behind the gap may be the same as or different from a length of the CP of data, i.e., may be dynamically adjusted. In other words, the time domain occupancy proportion of the gap, the CP and the reference signal may be dynamically adjusted on the reference signal symbol.

Figure 21:
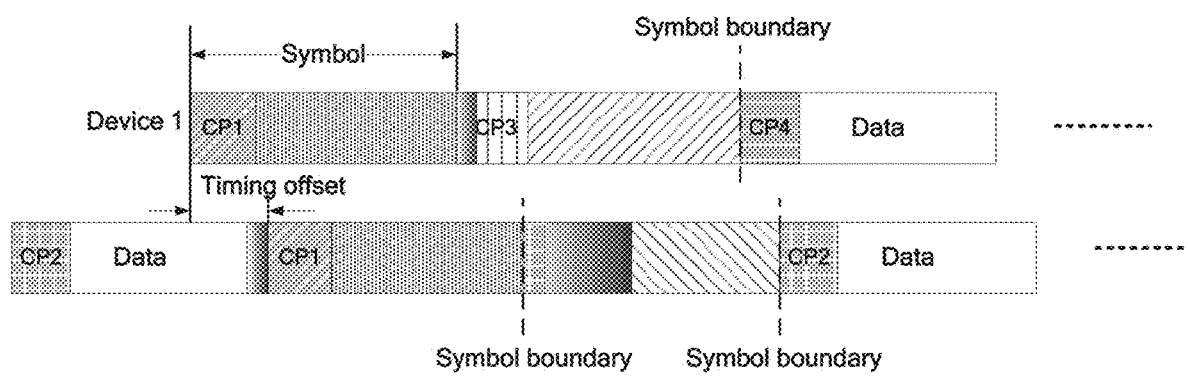
FIG. 21 is a fourth schematic diagram illustrating a structure of a transmission unit according to instance 3 of the present disclosure.

As shown in FIG. 17, since the timing offset between device 2 and device 1 exceeds the length of the CP1, the reference signal of device 2 interferes with the data of device 1. In order to avoid interference between the reference signal and the data between device 1 and device 2, a specific CP, for example, CP4 as shown in FIG. 21, may be introduced, and FIG. 21 is a fourth schematic diagram illustrating a structure of a transmission unit according to instance 3 of the present disclosure. Alternatively, as shown in FIG. 22, a gap may be introduced, and FIG. 22 is a fifth schematic diagram illustrating a structure of a transmission unit according to instance 3 of the present disclosure.

Figure 22:
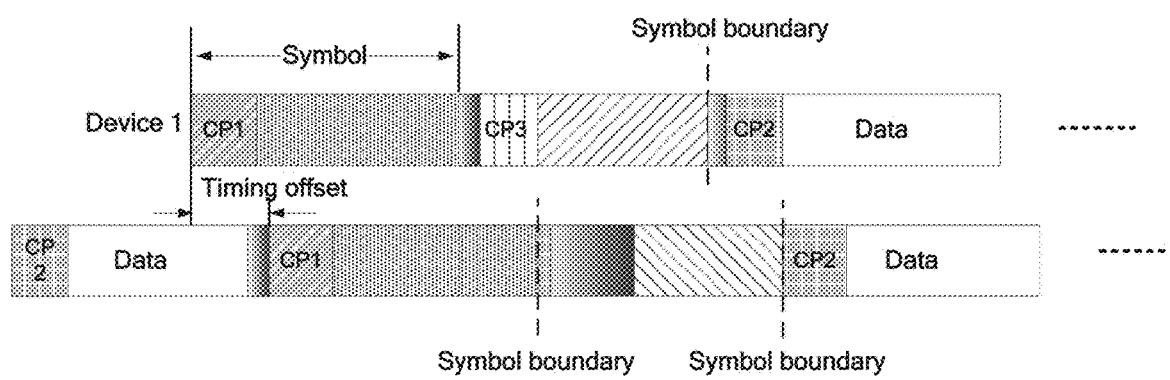
FIG. 22 is a fifth schematic diagram illustrating a structure of a transmission unit according to instance 3 of the present disclosure.

For FIG. 22, the lengths of the gap and the CP served as the preamble of data symbol may be dynamically adjusted to avoid the interference between the data channel and the reference signal.

Figure 23:
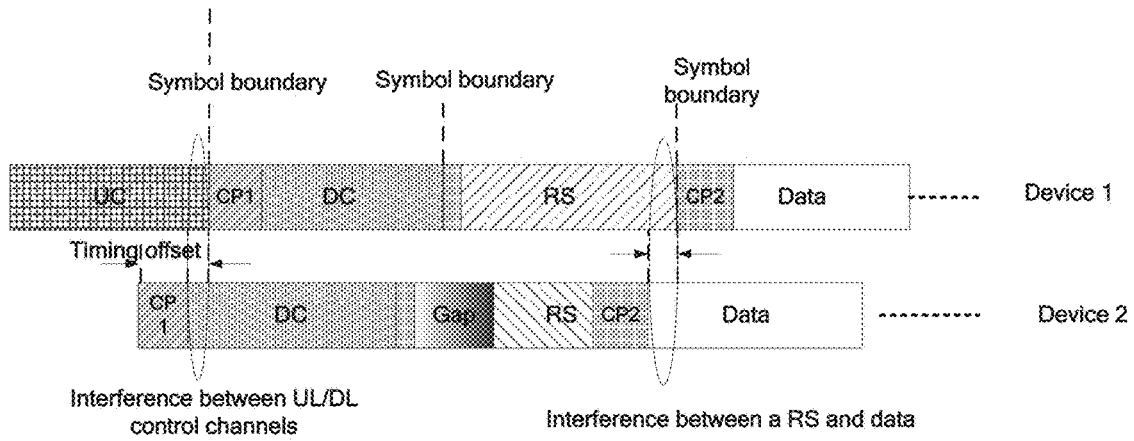
FIG. 23 is a sixth schematic diagram illustrating a structure of a transmission unit according to instance 3 of the present disclosure.

In another case, the timing offset of an uplink transmission device relative to a downlink transmission device exceeds the length of the CP, and the problem of cross-link interference occurs. FIG. 23 is a sixth schematic diagram illustrating a structure of a transmission unit according to instance 3 of the present disclosure. As shown in FIG. 23, the cross-link interference includes interference between physical uplink/downlink control channels and interference between the reference signal and the data.

In order to reduce and avoid or reduce the interference between the physical uplink/downlink control channels and the interference between the reference signal and the data caused by the timing offset between different devices exceeding the length of a CP, as illustrated in FIG. 23, the methods described below may be considered.

Method 1: A gap is introduced behind the PUCCH. The gap can not only provide sufficient time for at least one of uplink and downlink conversion, information scheduling, interference measurement and information interaction, but also avoid the interference between the PUCCH and the PDCCH.

Optionally, the duration of the gap located behind the PUCCH may be less than the length of a symbol, or may be not less than the duration of a symbol. In order to reduce waste of resources, optionally, the duration of the gap is not greater than the length of a symbol. At least one of the starting point of the gap or the duration of the gap may be configured through physical layer DCI signaling or higher-layer RRC signaling, or may be configured through predefinition, or may be dynamically adjusted according to the timing offset.

Optionally, the PUCCH may be located in front of the GAP. The PUCCH may be located within the same symbol as the gap, or be located in one or N symbols in front of the gap.

Figure 24:
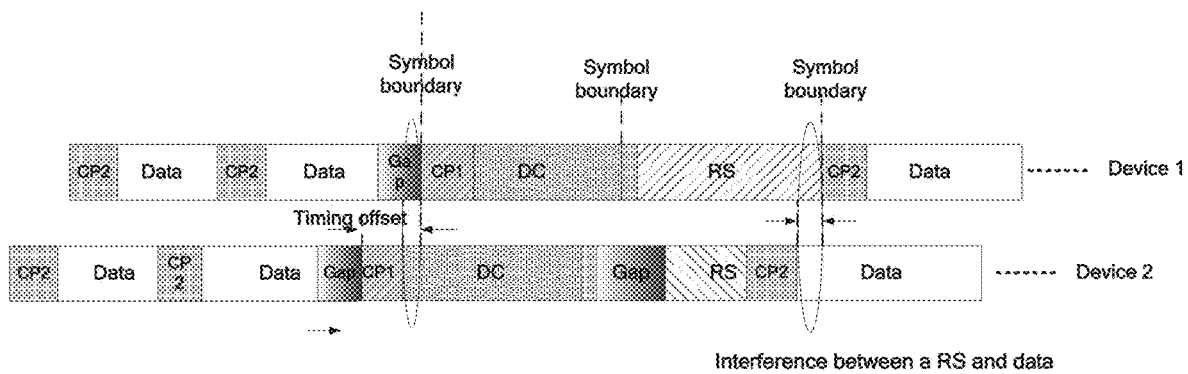
FIG. 24 is a seventh schematic diagram illustrating a structure of a transmission unit according to instance 3 of the present disclosure.

Method 2: A position of the PUCCH is adjusted. For example, the PUCCH may be located at the front end of data transmission. Optionally, at least one of the data or the gap may be sent at the position of the PUCCH on the last symbol. Preferably, the gap is sent on the end resource in the last symbol. The interference between the PUCCH of one device and the PDCCH of another device can be avoided to a certain extent. Optionally, the gap may occupy at least one of all or part of the original PUCCH time-frequency and frequency-domain resources. FIG. 24 is a seventh schematic diagram illustrating a structure of a transmission unit according to instance 3 of the present disclosure, as shown in FIG. 24.

In this method, for the downlink transmission structure, the PUCCH may be located behind the PDCCH and in front of the data transmission. Preferably, the gap may be introduced in front of the PUCCH for uplink and downlink conversion or information feedback in advance/in time. Likewise, for the uplink transmission structure, the PUCCH may be located behind the PDCCH and behind the UL gap. Thus, both the uplink transmission device and the downlink transmission device can implement alignment of PUCCHs between different devices by adjusting the GAP.

Figure 25:
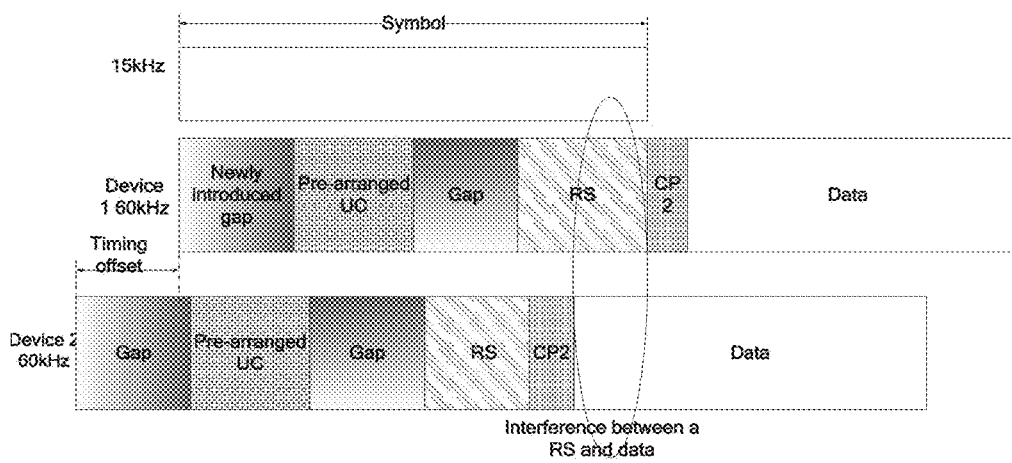
FIG. 25 is an eighth schematic diagram illustrating a structure of a transmission unit according to instance 3 of the present disclosure.

Optionally, the prefixed PUCCH may be time-division multiplexed with the prefixed reference signal in a time interval. For example, when the prefixed PUCCH and the prefixed reference signal are multiplexed through time division multiplexing (TDM) within one symbol, the subcarrier spacing used by the prefixed PUCCH and the prefixed reference signal may be configured to be different from the subcarrier space of the data followed. Preferably, the subcarrier space of the data is larger. FIG. 25 is an eighth schematic diagram illustrating a structure of a transmission unit according to instance 3 of the present disclosure, as shown in FIG. 25.

As shown in FIG. 25, the reference signal sent by device 1 is interfered with the data sent by device 2. Optionally, the length of a CP in the symbol in which data is sent by device 2 may be adjusted, or a gap is introduced at the beginning of the data symbol, or the subcarrier spacing in the data symbol may be adjusted, and the reference signal is sent at the front end, or the data starts to be transmitted from a specific position in the symbol or from a boundary of a specific symbol larger than the original subcarrier spacing.

Instance 4

Figure 26:
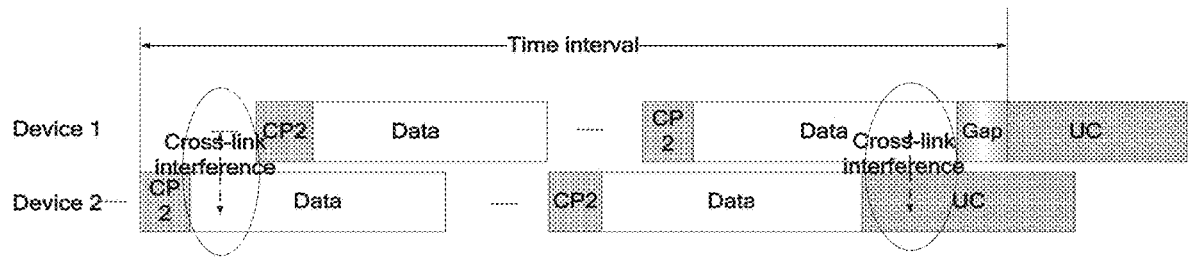
FIG. 26 is a schematic transmission diagram 1 when a relative timing offset between different devices exceeds a length of a CP according to instance 4 of the present disclosure.

In the above instances, problems of and solutions to reference signal interference between different devices and part of data channel interference have been described. In the present instance, the method for solving the interference problem of the timing misalignment/asynchronous operation between data channels when the relative timing offset between different devices exceeds the length of a CP is described. FIG. 26 is a schematic transmission diagram 1 when a relative timing offset between different devices exceeds the length of a CP according to instance 4 of the present disclosure, as shown in FIG. 26. In order to reduce/avoid the interference problem caused by the relative timing offset between different devices exceeding the length of a CP, device 1 may perform processing in at least one of the following manners.

Manner 1: A time domain resource of a symbol at the end of the data symbols is vacant. On the data resource, the vacant time domain resource can be obtained in at least one of the following ways: predefinition, configuration through physical layer DCI signaling, or notification through higher layer RRC signaling. Optionally, the resource may be pre-vacant, or may take effect immediately upon configuration, or may take effect through pre-configuration in combination with trigger signaling.

Manner 2: The length of the gap located behind data is adjusted. As shown in FIG. 26, a larger gap may be configured to avoid interference between the control channel and the data channel.

Manner 3: The position of the PUCCH is modified, and at least one of data or a gap may be sent at the position of the original PUCCH. The occupancy proportion of the data and the gap in one symbol may be dynamically adjusted.

Manner 4: Before data is sent actually, a gap resource is introduced for avoiding a conflict or interference with information transmission of another device.

Manner 5: The length of a CP located in front of the data symbol is adjusted. Optionally, part of resources at the end of the previous symbol is used for the CP in the next symbol, and a new CP length is formed by combining the part of resources with the CP located in front of the data symbol.

Figure 27:
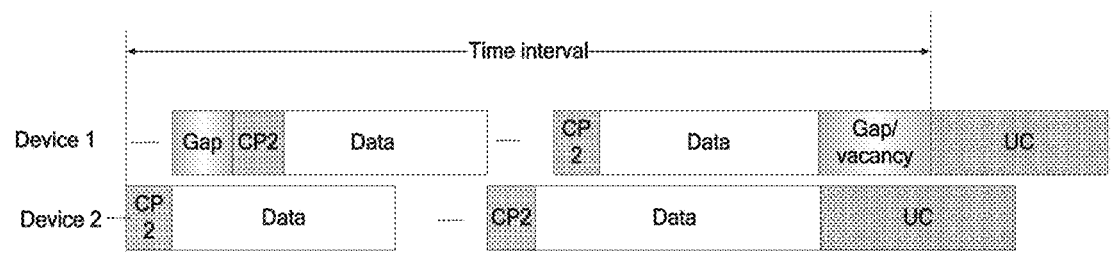
FIG. 27 is a first schematic display diagram of different devices according to instance 4 of the present disclosure.
Figure 28:
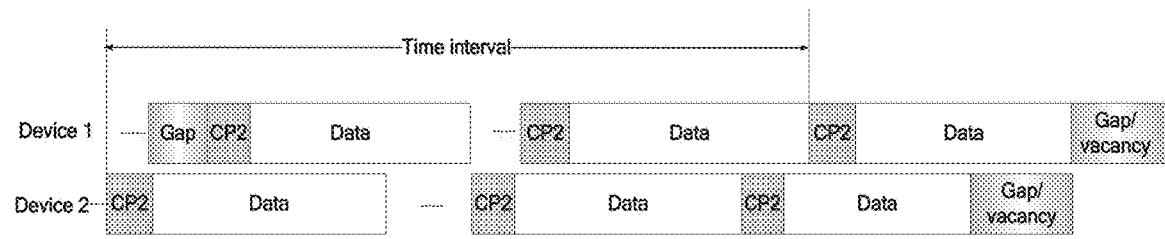
FIG. 28 is a second schematic display diagram of different devices according to instance 4 of the present disclosure.
Figure 29:
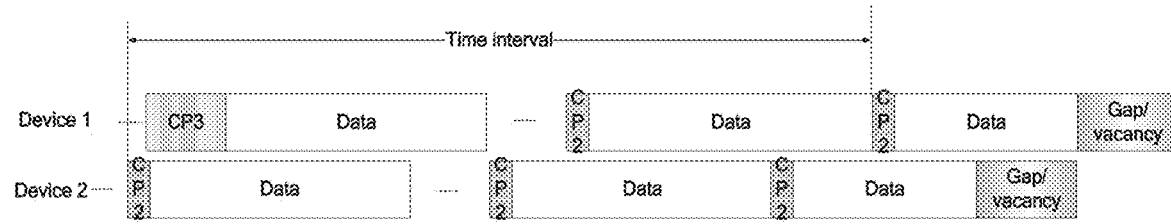
FIG. 29 is a third schematic display diagram of different devices according to instance 4 of the present disclosure.

In summary, at least one schematic diagram in the method is as shown in FIG. 27, FIG. 28 and FIG. 29. FIG. 27 is a first schematic diagram of different devices according to instance 4 of the present disclosure. FIG. 28 is a second schematic diagram of different devices according to instance 4 of the present disclosure. FIG. 29 is a third schematic diagram of different devices according to instance 4 of the present disclosure.

Device 2 may perform processing in at least one of the following manners.

Manner 1: The length of a CP is adjusted. That is, an occupancy time proportions of the CP and the data within the symbol is adjusted. Here, the length of the CP2 is increased. Thus, interference to information sent by the adjacent device 1 is reduced, and at least one of the occupancy time proportions of the CP or the PUCCH in the symbol is adjusted.

Manner 2: Before actual data starts to be transmitted, a gap is introduced for avoiding/reducing interference between adjacent devices.

Manner 3: A gap may be introduced in front of the PUCCH.

Manner 4: The position of the PUCCH is modified, and at least one of data or a gap may be sent at the position of the original PUCCH. The occupancy proportion of the data and the gap in one symbol may be dynamically adjusted.

In summary, a gap is introduced at each end of the data section. The starting point of the gap, the ending position of the gap, the starting position of the data, and the ending position of the data may be fixed or dynamically changed. At least one of the starting position of the gap, the ending position of the gap, the starting position of the data, or the ending position of the data may be determined in at least one of the following manners: predefinition, configuration through physical layer DCI signaling, or configuration through higher layer RRC signaling. The gap is introduced to adjust the interference caused by a large relative timing offset between different devices.

Instance 5

The present instance provides a solution to reference signal interference and/or data channel interference occurred when the numbers of symbols occupied by control channels of different devices are different.

In the present instance, a solution to reference signal interference and/or data channel interference is described with respect to at least one of the following situations: for example, there are two adjacent devices, one of which performs downlink transmission/reception, and the other performs uplink reception/transmission, and the number of symbols occupied by the control channel of one device is greater than the number of symbols occupied by the control channel of the other device; or the number of symbols occupied by the control channel of one device is less than the number of symbols occupied by the control channel of the other device. However, the solution is not limited to the above case, and may further be used for solving other similar interference problems.

First situation where the timing offset between different devices does not exceed the duration of a CP.

Figure 30:
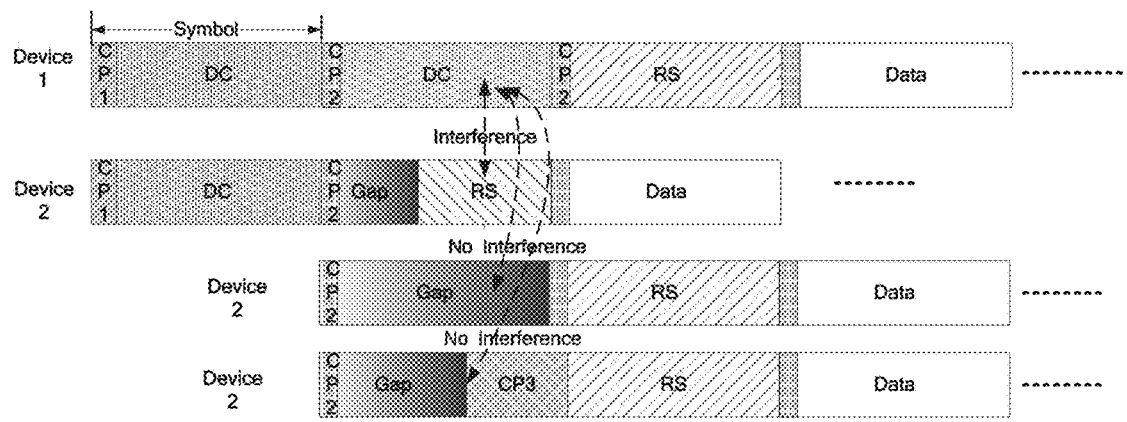
FIG. 30 is a schematic transmission diagram 1 when the numbers of symbols occupied by control channels of different devices are different according to instance 5 of the present disclosure.

Case 1: For the interference existed in the case where the number of symbols occupied by the control channel of device 1 is greater than the number of symbols occupied by the control channel of device 2, FIG. 30 is a schematic transmission diagram 1 when the numbers of symbols occupied by control channels of different devices are different according to instance 5 of the present disclosure. As shown in FIG. 30, device 1 performs downlink transmission and the PDCCH occupies two symbols, while device 2 performs uplink reception and the PDCCH occupies one symbol.

Since the uplink transmission timing and downlink transmission timing are different, when the number of symbols occupied by the PDCCH in downlink transmission is greater than the number of symbols occupied by the PDCCH in uplink transmission, for example, when the numbers of symbols occupied by uplink/downlink transmission devices are differed by one symbol, if the length of the gap between the PDCCH and the uplink transmission is less than one symbol and the prefixed reference signal is transmitted on the remaining symbols, the reference signal may interfere with the PDCCH of another device. Optionally, the PUCCH may be sent on the remaining resources of the GAP symbol located behind the PDCCH. The PDCCH and the PUCCH control channels may be multiplexed in a manner of FDM or code division multiplexing (CDM) or beams on the aligned time domain resources, so that the interference between the PDCCH and the PUCCH is reduced. In another case, if the length of the gap between the PDCCH and the uplink transmission is exactly one symbol, that is, a section combined by a PDCCH and the gap of one device is aligned with a section of a PDCCH of another device and, at this time, a prefixed uplink/downlink reference signal is located at the beginning of data transmission, no reference signal interference occurs. The transmission device may obtain/identify a link transmission direction through a reference signal, so as to adjust a transmission strategy in the case of cross-link interference. For example, the transmission device decides, according to priority levels, who performs transmission, or adjusts the transmission power, or schedules the transmission device with small interference to perform transmission on the resource, etc. Optionally, if the reference signal has a measurement function, the device receiving the reference signal performs interference measurement and notifies the counterpart device of the measurement result on the latest feedback resource. The feedback resource is, for example, a PUCCH resource, or a PDCCH resource, or a specific resource. The feedback resource may be notified to the device through predefinition, or physical layer DCI signaling, or higher-layer RRC signaling.

Optionally, in order to avoid reference signal interference, a dynamic CP may be introduced behind the gap in the uplink transmission structure. In FIG. 30, at least one of the CP2, the gap, a long CP (e.g., CP3), the starting position of the reference signal, the ending position of the reference signal, or the length of the reference symbol may be obtained through at least one of predefinition, physical layer DCI signaling, or higher-layer RRC signaling.

Figure 31:
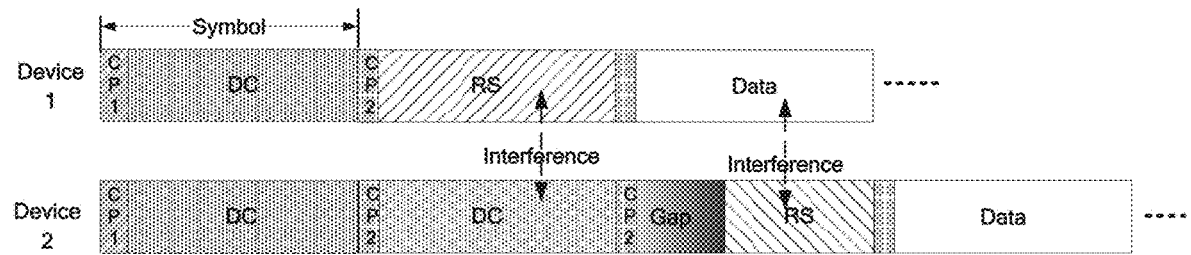
FIG. 31 is a second schematic diagram illustrating a structure of a transmission unit according to instance 5 of the present disclosure.

Case 2: when the number of symbols occupied by the control channel of device 1 is less than the number of symbols occupied by the control channel of device 2, the interference is shown in FIG. 31. FIG. 31 is a second schematic diagram illustrating a structure of a transmission unit according to instance 5 of the present disclosure. As shown in FIG. 31, device 1 performs downlink transmission and the PDCCH occupies one symbol, while device 2 performs uplink transmission and the PDCCH occupies two symbols.

In the case shown in FIG. 31, preferably, for device 2, the duration of the gap between the PDCCH and the uplink transmission is as small as possible to implement at least one of the alignment of uplink/downlink reference signals or reduction of resource waste in the downlink transmission structure. Optionally, the reference signal and the gap are configured to be in the same symbol, and are multiplexed in the manner of TDM. Less preferably, the reference signal may also be configured on the first complete symbol behind the gap.

For device 1, a gap is introduced behind the PDCCH to reduce interference to the control channel of the adjacent device. Alternatively, a long CP is introduced. Optionally, the reference signal is configured at a specific resource behind the gap. The specific resource may be the first symbol behind the gap. Less preferably, in order to achieve the symmetric design of uplink and downlink reference signals, the position of the downlink reference signal may be determined, based on the uplink transmission structure, according to a position of at least one of the gap or the uplink reference signal in the uplink transmission structure.

To reduce the overhead of introducing the gap, device 1 may preferably send a control channel on a control channel resource aligned with the adjacent device. The control channel may be used for subsequent transmission of at least one of scheduling signaling, trigger signaling, interference measurement signaling, or the like.

Second situation where the timing offset between different devices exceeds the duration of a CP.

Figure 32:
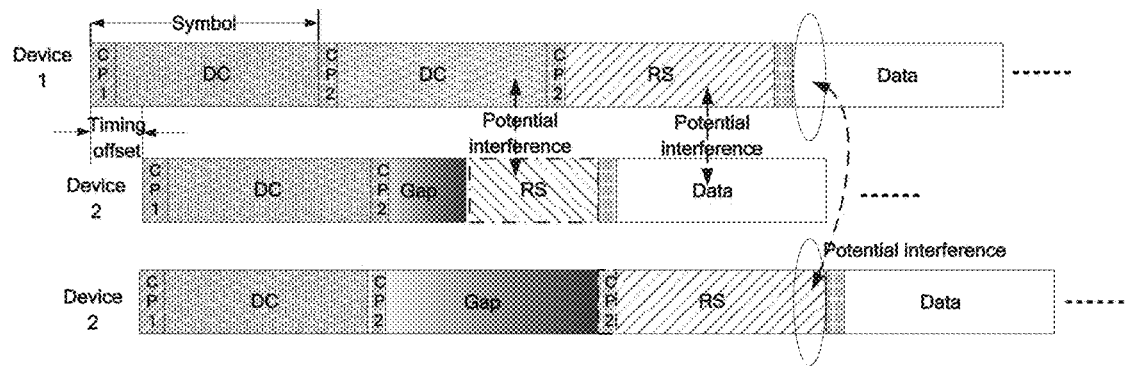
FIG. 32 is a schematic transmission diagram 3 when the numbers of symbols occupied by control channels of different devices are different according to instance 5 of the present disclosure.

Case 1: when the number of symbols occupied by the control channel of device 1 is greater than the number of symbols occupied by the control channel of device 2, the interference is shown in FIG. 32. FIG. 32 is a schematic transmission diagram 3 when the numbers of symbols occupied by control channels of different devices are different according to instance 5 of the present disclosure. As shown in FIG. 32, device 1 performs downlink transmission and the PDCCH occupies two symbols, while device 2 performs uplink reception and the PDCCH occupies one symbol.

In the case that device 1 is advance in timing relative to device 2 and the number of symbols occupied by the control channel of device 1 is greater than the number of symbols occupied by the control channel of device 2, at least one of interference between the PDCCH and the reference signal or interference between the data and the reference signal occurs if the reference signal of device 2 is located behind the gap and is at the same symbol as the gap.

Conversely, if the reference signal of device 2 is located behind the gap and the gap is exactly one symbol, for example, the reference signal of device 2 is located at the first symbol behind the gap, interference between the reference signal and data occurs. At this time, for device 2 which is advance in timing, at least one of a CP and a gap may be introduced in the data symbol. That is, the interference between the data and the reference signal is reduced by adjusting the occupancy duration proportion among at least one of the CP, the gap and the data.

Figure 33:
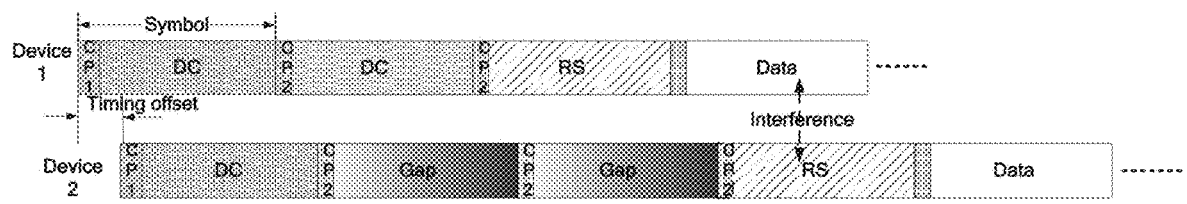
FIG. 33 is a schematic transmission diagram when a gap between a physical downlink control channel and uplink transmission is greater than one symbol according to instance 5 of the present disclosure.
Figure 34:
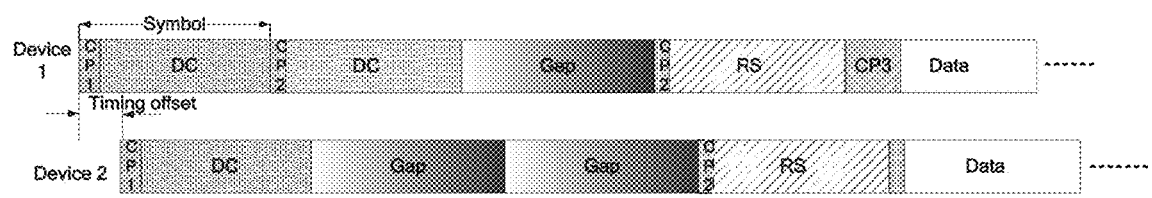
FIG. 34 is a schematic transmission diagram 4 when the numbers of symbols occupied by control channels of different devices are different according to instance 5 of the present disclosure.

However, when the gap between the PDCCH and the uplink transmission is greater than one symbol, a schematic transmission is shown in FIG. 33 which is a diagram according to instance 5 of the present disclosure. As shown in FIG. 34, in order to implement at least one of the alignment/symmetric design of uplink and downlink reference signals or to avoid or reduce the reference signal interference, at least one of a gap or a long CP may be introduced behind the PDCCH and/or in front of the reference signal of device 1 which is advance in timing. FIG. 34 is a schematic transmission diagram 4 when the numbers of symbols occupied by control channels of different devices are different according to instance 5 of the present disclosure.

Figure 35:
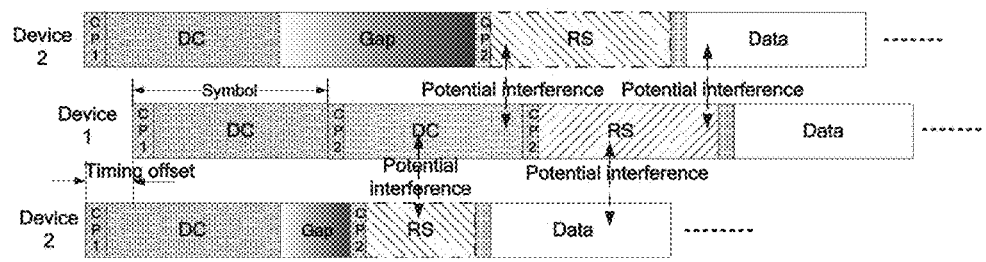
FIG. 35 is a schematic transmission diagram 5 when the numbers of symbols occupied by control channels of different devices are different according to instance 5 of the present disclosure.

When device 2 is advance in timing relative to device 1 and the number of symbols occupied by the control channel of device 1 is greater than the number of symbols occupied by the control channel of device 2, the interference is shown in FIG. 35 which is a schematic transmission diagram 5 according to instance 5 of the present disclosure.

Figure 36:
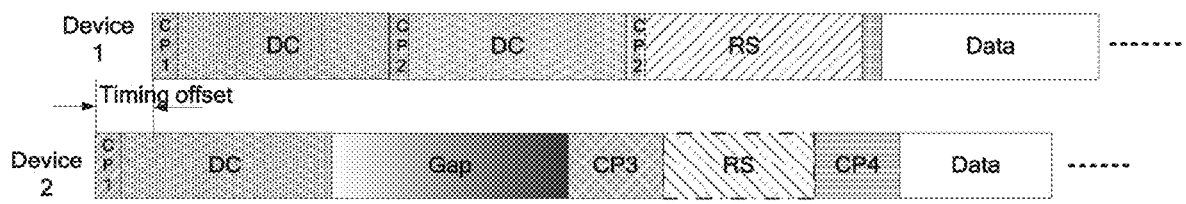
FIG. 36 is a schematic transmission diagram 6 when the numbers of symbols occupied by control channels of different devices are different according to instance 5 of the present disclosure.

For device 2, when the gap between the PDCCH and the uplink transmission is less than the length of a symbol, the uplink reference signal is configured on the remaining resources in the symbol of the gap. In this case, interference between the reference signal and the PDCCH and/or interference between the data channel and the downlink reference signal occurs. Based on the above, duration of the gap between the PDCCH and the uplink reference signal is not less than one symbol, and the long CP is introduced in front of at least one of the reference signal or the data, as shown in FIG. 36. FIG. 36 is a schematic transmission diagram 6 when the numbers of symbols occupied by control channels of different devices are different according to instance 5 of the present disclosure.

Figure 37:
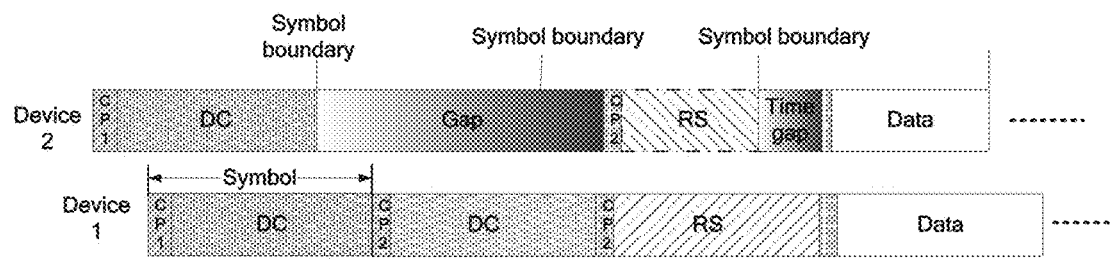
FIG. 37 is a schematic transmission diagram 7 when the numbers of symbols occupied by control channels of different devices are different according to instance 5 of the present disclosure.

For device 2, when duration of the gap between the PDCCH and the uplink transmission is exactly one symbol, the reference signal of device 2 is interfered by the PDCCH of device 1, and/or the data transmission of device 2 is interfered by the reference signal of device 1. Device 1 is interfered by device 2 in the same way. In order to avoid the above interference, the duration of the gap between the PDCCH and the reference signal is adjusted and/or a gap is introduced in front of the data symbol, as shown in FIG. 37. In this case, the length of the CP in front of the data and/or the reference signal is not changed. FIG. 37 is a schematic transmission diagram 7 when the numbers of symbols occupied by control channels of different devices are different according to instance 5 of the present disclosure. Optionally, a length of at least one of a variable gap or CP (the CP is located in front of the reference signal) is configured between the PDCCH and the uplink reference signal. A length of at least one of the gap or the CP (the CP is located in front of the data) between the reference signal and the data is variable.

Figure 38:
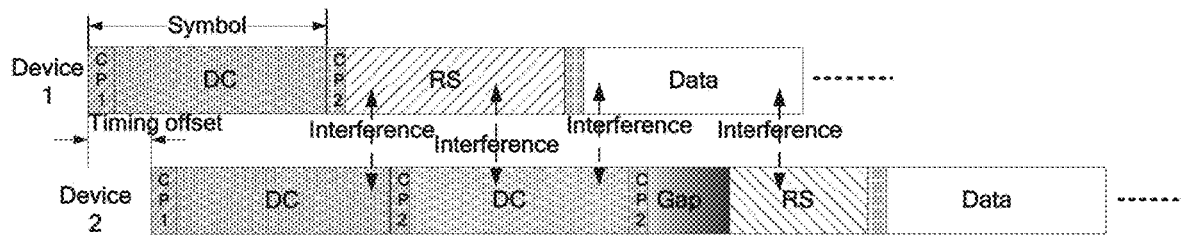
FIG. 38 is a schematic transmission diagram 8 when the numbers of symbols occupied by control channels of different devices are different according to instance 5 of the present disclosure.
Figure 39:
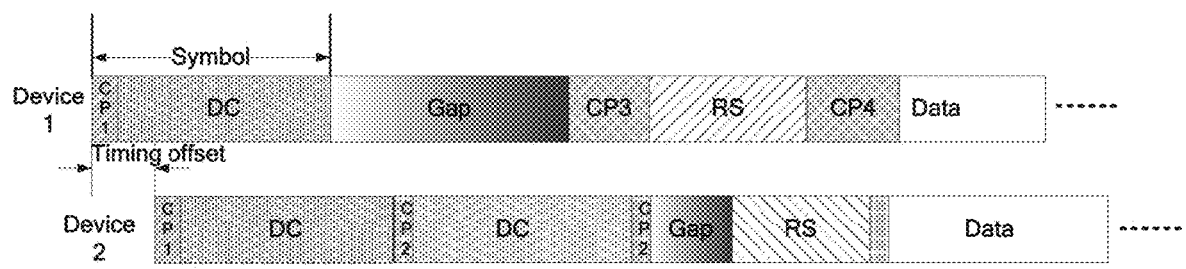
FIG. 39 is a schematic transmission diagram 9 when the numbers of symbols occupied by control channels of different devices are different according to instance 5 of the present disclosure.

Case 2: when the number of symbols occupied by the control channel of device 1 is less than the number of symbols occupied by the control channel of device 2, the interference is shown in FIG. 38 which is a schematic transmission diagram 8 according to instance 5 of the present disclosure. As shown in FIG. 38, device 1 performs downlink transmission and the PDCCH occupies one symbol, while device 2 performs uplink reception and the PDCCH occupies two symbols. As shown in FIG. 38, the downlink reference signal of device 1 is interfered by the PDCCH of device 2; and/or the data of device 1 is interfered by the reference signal of device 2 (no matter how large the gap between the PDCCH and the uplink transmission is and/or no matter where the reference signal is located, the data of device 1 will be interfered by the reference signal of device 2). Conversely, a symbol of the control channel of device 2 is interfered by at least one of the reference signal or the data of device 1, and the reference signal of device 2 is interfered by the data of device 1. Based on the above, device 1 may perform at least one of the following operations: a length of the CP2 in front of the reference signal is adjusted; and a gap is introduced in front of the reference signal. Optionally, at least one of the following operations may be performed behind the reference signal of device 1 and in front of the data: a gap is introduced; and the length of the CP is adjusted. FIG. 39 is a schematic transmission diagram 9 when the numbers of symbols occupied by control channels of different devices are different according to instance 5 of the present disclosure, as shown in FIG. 39.

Instance 6

The present instance provides a solution to reference signal interference and/or data channel interference occurred when different numerology are used by different devices.

Figure 40:
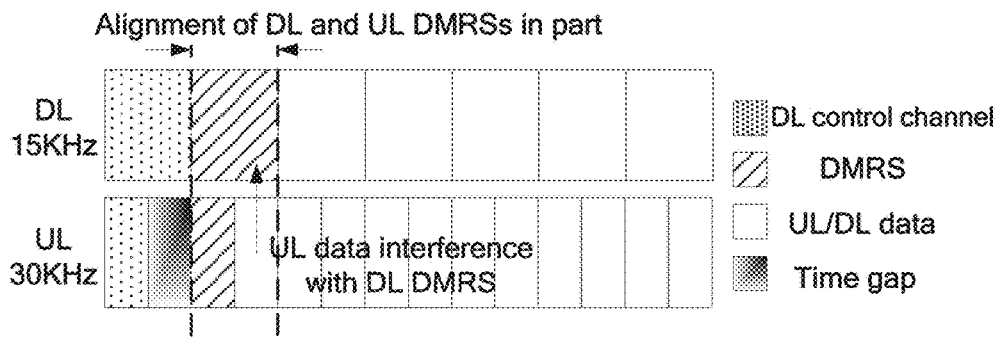
FIG. 40 is a schematic transmission diagram when different devices use different subcarrier spacings and have opposite transmission link directions according to instance 5 of the present disclosure.

When different devices use different subcarrier spacings and have opposite transmission link directions, the interference between the reference signal and the data is shown in FIG. 40. FIG. 40 is a schematic transmission diagram when different devices use different subcarrier spacings and have opposite transmission link directions according to instance 6 of the present disclosure.

In order to reduce the interference, at least one of the solutions described below may be adopted.

Solution 1: A DMRS is sent on all symbols aligned with a symbol on which the DMRS is sent in the device that uses the smaller subcarrier spacing.

Solution 2: For the device that uses the larger subcarrier spacing, a long gap is introduced.

Solution 3: The CP and the DMRS time domain transmission structure on the DMRS symbol of the device that uses the smaller subcarrier spacing are dynamically adjusted.

Solution 4: The subcarrier spacing of the DMRS of the device that uses the small subcarrier spacing in the frequency domain is amplified.

Figure 41:
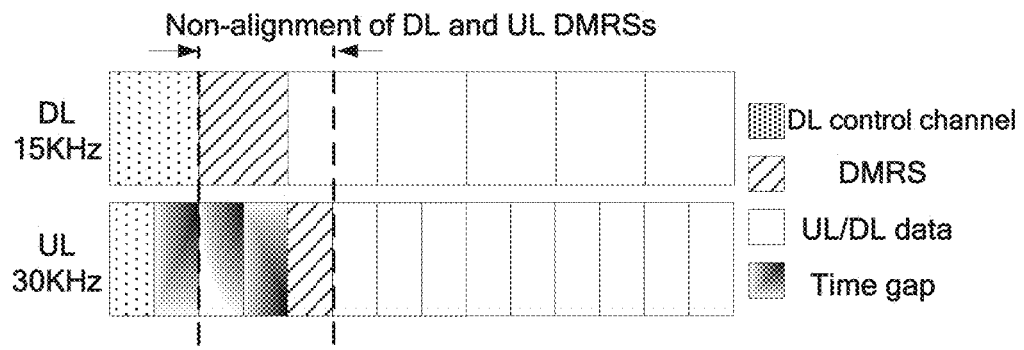
FIG. 41 is a schematic transmission diagram when timing between downlink (DL) control and uplink (UL) data is large according to instance 5 of the present disclosure.

FIG. 41 is a schematic transmission diagram according to instance 6 of the present disclosure, which illustrates the situation when timing between the DL control and the UL data is large.

For this case, the above solutions such as introducing a DL gap in the DL transmission structure, or modifying the subcarrier spacing of a DL DMRS, introducing a long CP, and the like may be used.

The method and apparatus for aligning uplink transmission with downlink transmission provided in the embodiments of the present invention are used for solving the cross-link interference occurred in the flexible duplex/dynamic TDD transmission mode caused by at least one of the following: the timing relationship between the PDCCH and the downlink data is different from the timing relationship between the PDCCH and the uplink data; different numerology may be used in the uplink and downlink transmission links; the numbers of symbols occupied by control channels of different devices are different; and the relative timing offset between different devices exceeds duration of the cyclic prefix.

Instance 7

The present instance provides an example where multiple adjustment amounts (e.g., different channels/signals have different adjustment amounts) are provided for one device.

The synchronization/alignment between downlink transmission of device 1 and uplink transmission of device 2 is described below.

Device 2 may adjust at least one of the timing amount of the control channel, the timing amount of the RS, the timing amount of physical uplink shared channel (PUSCH) transmission, or the timing amount of the SRS to synchronize/align with the downlink transmission of device 1, with the downlink transmission structure of device 1 being unchanged. In order to ensure alignment with downlink transmission of the adjacent cell, device 2 of the present cell may adjust at least one of the following timing amounts: an adjustment amount used for adjusting the RS, an adjustment amount used for adjusting the PUSCH transmission, and an adjustment amount used for adjusting the SRS. Adjustment amounts for at least one of different purposes or different attributes are different or may be the same for the same device. In other words, different channels/signals have different adjustment amounts for the same device. However, for the present cell, the timing relationship of the SRS transmissions may be adjusted between different UEs such that the transmissions cannot be multiplexed or aligned on the same symbol. At this time, the adjustment amount of the SRS is for keeping alignment with other UEs in the cell, where different UEs have different adjustment amounts for SRS transmission such that at least one of the following is achieved: symbol alignment can be ensured; and SRSs sent by the different UEs are aligned with each other for a receiving side.

Optionally, timing synchronization between two UEs of uplink Multi-User Multiple-Input Multiple-Output (MU-MIMO) needs to be ensured first (for example, timing synchronization/alignment between UEs that perform MU-MIMO is ensured by introducing the adjustment amount), so that timing synchronization with other UEs can be considered.

In another case, device 1 may adjust at least one of the timing amount of the control channel, the timing amount of the downlink RS, or the timing amount of physical downlink shared channel (PDSCH) transmission to synchronize/align with the uplink transmission of device 2, with the uplink transmission structure of device 2 being unchanged. The positions of at least one of some channels or signals are not adjustable, for example, the position (e.g., symbol or subframe) of the time domain resource where a control channel, or a multimedia broadcast single frequency network (MBSFN), or a primary synchronization signal (PSS)/secondary synchronization signal (SSS), or a CSI-RS, or a CRS, or a physical broadcast channel (PBCH), or the like is located is not adjustable. If the adjustment is to be made, an adjustment amount may be introduced in front of these channels/signals to ensure or avoid cross-link interference. At this time, these channels/signals may perform at least one of the following operations: a sending position is adjusted; an uplink device vacates resources and does not perform sending at the position corresponding to these signals/channels; and the send power is reduced. However, for different cells under the same base station, or under the same operator, or under the same system, in order to ensure interference between the same-direction links, the adjustment amount of at least one of the PUCCH, the RS, the PDSCH, the PSS/SSS, the CSI-RS, the CRS, or the PBCH is introduced for at least one of the different cells under the same system, under the same base station, or under the same operator to be aligned. Cells are different for different systems, or different base stations, and different operators.

The adjustment amount may be embodied in at least one of: introducing a dynamic gap duration; or introducing a dynamic CP duration, or the like.

Instance 8

The present instance gives an example in which multiple timing advance (TA) amounts are provided. That is, for a device, different TA amounts may be configured for at least one of the channel or the signal in a time unit. Multiple TA amounts are introduced for at least one of: adjusting signals in the device and other devices; or adjusting the timing alignment/synchronization of signals of the device with signals of other devices. Thereby a reduction or attenuation of cross-link interference is achieved. The channel and/or the signal may be any channel and/or signal described in the existing LTE or new radio (NR). The signal or the channel may be at least one of uplink or downlink.

The method described in the present instance will be specifically exemplified below.

In a time unit, at least one of the channel or signal transmitted is a PDCCH or data. In all the following examples, two OFDM symbols are occupied by the control channel. However, when other number of symbols are occupied by the control channel, the manner is the same. No more examples are given here.

Figure 42:
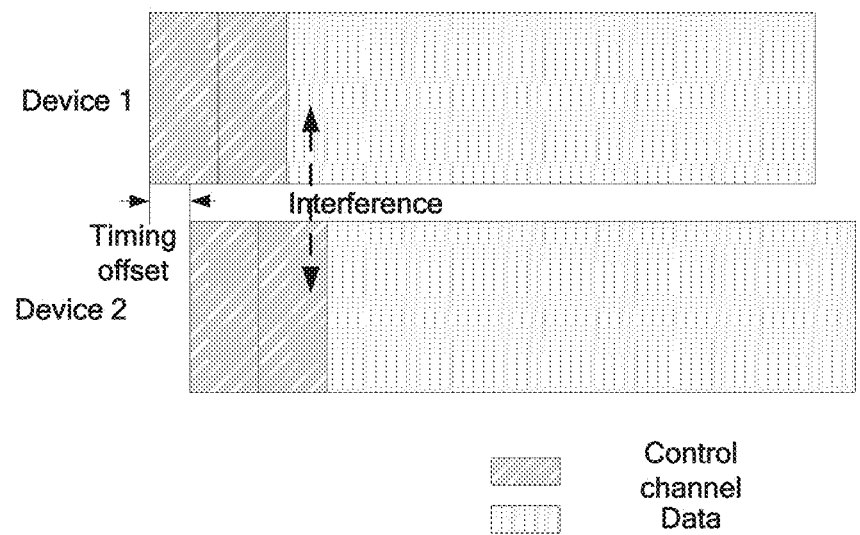
FIG. 42 is a schematic diagram of a timing offset between a device 1 and a device 2 according to instance 9 of the present disclosure.

It is assumed that a timing offset exists between device 1 and device 2 and device 1 is advanced by one timing offset relative to device 2, as shown in FIG. 42. FIG. 42 is a schematic diagram of a timing offset between device 1 and device 2 according to instance 8 of the present disclosure, Alignment between different devices may be achieved in at least one of the following manners.

Manner 1: Device 2 adjusts forward by a TA amount or device 1 adjusts backward by a TA amount. This enables timing alignment of transmission of device 2 with transmission of device 1. For manner 1, the TA is an adjustment amount of the control channel and the data channel. Preferably, the adjusted TA amount may not be greater than the timing offset amount between device 1 and device 2 because the CP may also be used to implement the timing synchronization to avoid interference.

Manner 2: Device 2 performs at least one of the following operations: the control channel is adjusted forward by a TA amount; and the data channel is adjusted forward by a TA amount. The TA adjustment amounts for the control channel and the data channel in device 2 may be different or the same.

Further, it is assumed that merely the TA amount of the data channel is adjusted without adjusting the TA amount of the control channel, so that the interference in the data sections of different devices is weakened or reduced. The data channel is advanced by a TA amount so that the data channel overlaps the control channel. In this case, the data channel may include at least one of: starting from a second symbol behind the control channel; starting mapping from a specific position in the first symbol behind the control channel, and performing vacancy, no data transmission, or silence on symbols or resources behind the control channel and between the beginning of data symbols.

Alternatively, it is assumed that the TA amount of the control channel is adjusted without adjusting the TA amount of the data channel. In this case, the control channel being adjusted TA may be overlapped with data or control channel in the previous time unit, or overlapped with the data, or the signal, or the control channel in the current time unit. In this case, resources on the last symbol or on a part of symbols in a time unit are vacant, or a gap is introduced, or the data mapping in the present unit starts from a specific position in the first symbol behind the control channel or from the second symbol, or a long CP is introduced on the first symbol of the data section. Resources between the control channel and the beginning of data transmission are vacant, or not used for mapping data, or not used for transmitting data, or for introducing a gap.

Alternatively, it is assumed that, both the control channel and the data channel are adjusted by a TA amount, and the TA amount of the control channel and the TA amount of the data channel may be two different TA amounts. For example, the control channel of device 2 is adjusted forward by a TA value and the data channel section is also adjusted forward by a TA value. At least one of the adjusted data channel section or the control channel section is partially overlapped; or at least one of the adjusted data channel section or the control channel is partially overlapped with the data channel, or the signal, or the control channel in the previous time unit. In this case, the time domain length occupied by the control channel may be shortened, or a symbol or a part of symbols at the end of a position of the time domain occupied by the control channel is not used for mapping or is vacant or is not used for sending, or a symbol or a part of resources of a symbol at the beginning of the data channel section or a specific time is for mapping data or is not for sending. That is, for the data section, data mapping starts from one symbol, or a part of resources of one symbol, or a specific time position. Similarly, for the case where a control channel section is overlapped with the channel or signal in the end in the previous time unit, the specific time resource or a symbol at the end of the previous time unit or a resource at the end of a symbol may be vacant, or discarded, or not used for mapping.

Manner 3: Device 1 may perform at least one of the following operations: the control channel is adjusted backward by a TA amount; and the data channel is adjusted backward by a TA amount. The TA adjustment amounts for the control channel and the data channel in device 1 may be different or the same.

Further, it is assumed that merely the data channel is adjusted by a TA amount without adjusting the control channel, so that the interference in the data sections of different devices is weakened or reduced. In this case, the data channel section may perform data mapping from a specific time position. The resource between the control channel section and the beginning of the data channel transmission may be vacant or may be a gap. Alternatively, at least one of the following is included: a long CP may be used as the first CP of the data channel section; and a gap is introduced between the control channel and the data. Further, since the data channel section is delayed backward by a TA amount, the data channel section is overlapped with the control channel section of the next time unit. In this case, the resource at the end of the data channel section may be not used for data mapping, or may be for discarding data, or may be vacant, or may be for introducing a gap, or the CP at the beginning of the control channel part is a long CP. The specific time length may be one symbol, or two symbols, or a part of symbols, or a specific time duration notified through signaling (predefinition, or higher-layer RRC signaling, or physical layer DCI signaling).

It is assumed that the control channel is adjusted by the TA amount without adjusting the data channel. In this case, the control channel being adjusted by TA may be overlapped with data or control or a reference signal or a specific signal. At this time, timing alignment with other devices may be achieved in at least one of the following manners: a long CP may be introduced into the data channel section; the data channel starts mapping from a specific time position; a gap is introduced between the control and the data section; the data at a specific time at the beginning of the data section is discarded; and no transmission is performed. The specific time length may be one symbol, or two symbols, or a part of symbols, or a specific time duration notified through signaling (predefinition, or higher-layer RRC signaling, or physical layer DCI signaling).

It is assumed that, both the control channel and the data channel are adjusted by the TA amount, and the TA amount adjusted for the control channel and the TA amount adjusted for the data channel may be two different TA amounts. For example, the control channel of the device is adjusted backward by a TA value and the data channel section is also adjusted backward by a TA value. Overlapping exists in at least one of the adjusted data channel section or the adjusted control channel section, or the adjusted data channel section is overlapped with at least one of the control channel or the data channel in the next time unit, and so on. In this case, a long CP may be used at the beginning of the data channel section, or mapping starts from a specific time position at the beginning of the data channel section, or a gap is introduced between the control channel and the data, or no transmission is performed within specific time at the beginning of the data channel section. Alternatively, the resource on the specific time duration at the end of the data channel is vacant, or is not used for performing data mapping, or is not used for performing data transmission, or a gap is introduced at the end of the data channel; or a gap is introduced in front of the control channel, or a gap is introduced at the end of the data channel, and a gap is introduced in front of the control channel, or a long CP is introduced at the beginning of the control channel section, or the time domain length occupied by the control channel may be shortened, or a symbol or a part of symbols at the front/end of the time domain position occupied by the control channel is not for mapping, or is vacant, or is not for sending.

The specific position is determined by at least one of: a length of a gap or a length of a CP.

At least one of the length of the gap, a starting point of the gap, an ending position of the gap, a position at which data mapping starts, a position at which data mapping stops, the above TA adjustment amount for different signals and channels, the length of the CP, a position of the CP, or a position (starting point, the number of symbols, ending position) of the reference signal may be obtained through at least one of: predefinition, higher-layer RRC signaling, or physical layer DCI signaling.

When a time unit includes at least one of a PUCCH, a PDCCH, uplink data, downlink data, an uplink reference signal, a downlink reference signal, a system signal, a broadcast channel, a synchronization signal section or the like, the above method can be used for the timing alignment caused by a timing offset between different devices. The method specifically includes at least one of the following: different sections in the time unit are configured with one or one TA adjustment amounts or each are configured with one TA adjustment amount; a long CP is introduced; and a gap is introduced. That is, at least one of the following is used: adjusting TA values of different sections; introducing a gap into at least one of a front end or a rear end of at least one of the above-mentioned sections; or using a long CP at the front end of at least one of the above-mentioned sections to adjust timing alignment of at least one of channels or signals between different devices.

The method in the present embodiment may be used for timing alignment between devices on a terminal side, and may also be used for timing alignment between devices on a base station side.

The timing offset mentioned in the present disclosure is obtained by at least one of the base station and the terminal UE through measurement. A new measurement quantity may be introduced for measuring a timing offset of at least one of the base station or the terminal. Further, the timing offset may also be obtained in at least one of the following manners: predefinition, indication through physical layer DCI signaling, and configuration through higher-layer RRC signaling. At least one of the base station or the terminal takes the measured or obtained timing offset amount as a basis for adjusting the TA so as to achieve timing alignment.

The terminal can be notified to make corresponding adjustment only when a TA offset from the device to be aligned is known in advance. How to measure the TA offset from other devices? A new measurement quantity needs to be introduced, and is first configured to the terminal to measure the timing offset between the terminal itself and the adjacent device that needs to be aligned with. The result of the measurement needs to be fed back to the base station. The base station achieves timing synchronization based on the TA adjustment amount fed back by the terminal. Alternatively, the terminal achieves uplink timing synchronization or downlink timing synchronization based on the measured timing offset. The measurement quantity may be a signal based on the existing RRM measurement, or RSRP measurement, or DMRS measurement, or the like.

Instance 9

The present instance mainly achieves timing alignment through TA adjustment when multiple TAs are introduced on the base station side.

Misalignment between base stations may occur on the base station side. Two synchronization demands need to be considered at the same time: for the same-direction link, the intra-cell UEs need to be synchronized with each other, and the different cells need to be synchronized with each other; for the cross link, the uplink and the downlink in the same cell need to be synchronized with each other, or uplinks and downlinks between different cells need to be synchronized with each other.

The base station introduces multiple TAs, and in a time unit, different signals or channels, or different signal or channel portions may send timings differently. For example, the control channel is at timing 1 and the data channel is at timing 2. If the timing/timing offset needs to be obtained by using a preamble, the timing/timing offset is the same as the timing or timing offset of subsequent data. In this way, the timing of the subsequent data may be obtained by obtaining the timing of the preamble.

Different timings are for different objects. That is, a certain timing is valid for a certain period of time, and beyond this time range, another timing or the original timing is used. For example, multiple timings are provided, one being a reference timing and others being relative timings.

Terminal 1 and terminal 2 are served by base station 1, and terminal 1 needs to receive a PDSCH while terminal 2 currently does not need to receive the PDSCH.

In this case, terminal 1 may perform at least one of the following operations: directly receiving PDSCH data sent from base station 1, and determining the current timing/timing offset of the base station side based on the received downlink data; obtaining or determining the current timing/timing offset by receiving a preamble located in front of the PDSCH data, so that the TA is adjusted based on the obtained timing offset to achieve synchronization when subsequent PDSCH data is receive; and adjusting the TA based on the offset sent from the base station and thereby receiving downlink data and maintaining timing synchronization.

Terminal 2 does not need to receive the PDSCH, but can perform synchronous tracking based on a signal in the PDSCH. At this time, terminal 2 may perform at least one of the following operations: obtaining a new TA by tracking the signal in the PDSCH, where the new TA is different from the original TA. In order for terminal 2 to achieve synchronization between the subsequent received downlink data, at least one of the following methods may be used: the base station sends an offset to terminal 2, and terminal 2 may adjust TA based on the offset so as to receive downlink data and keep timing synchronization; terminal 2 obtains the timing/timing offset or the subsequent TA adjustment amount by receiving the preamble located in front of the PDSCH data; and a resource configuration or reservation manner is used. At least one of measurement or timing synchronization cannot be performed on some resources, and a device may perform at least one of timing synchronization or measurement on some specific resources. For example, the device may implement at least one of timing synchronization or measurement through a control channel.

Instance 10

The present instance mainly describes the following several problems related to the present application, and the corresponding solutions.

Several problems described below exist.

1. For unsynchronized cells, there is no doubt that a cross-link interference problem may exist even if the sending and receiving directions of two gNBs are exactly the same. When one gNB (gNB1) is sending a DL, another gNB (gNB2) should also send a DL. However, since the timing of gNB2 is earlier than the timing of gNB1, UL reception is advanced. Therefore, the DL of gNB1 may interfere with the UL reception of gNB2. However, this still depends on the timing offset between gNB1 and gNB2. If the offset is not large, the interference problem is not severe because a gap (greater than or equal to TA plus encoding and decoding delay) exists between the DL and the UL of gNB2.

This problem also exists in LTE TDD or enhanced interference management for traffic adaptation (eIMTA), and is understood to be not a new and major problem, but may of course be considered.

2. The timing misalignment herein may be researched on a basis that two cells are assumed to be synchronized.

As previously described, unsynchronization brings complexity of the research. Timing misalignment is mainly caused by cross-link transmission delay and radio frequency switching and not by unsynchronization.

That is, the research premise should be that: it is assumed that two cells are synchronized, sending directions of main portions (demodulation/measurement signals and data, excluding SRSs) are not the same, and DCI/uplink control information (UCI) sending positions and directions are the same.

Based on this, cross-link interference is not mainly caused by timing misalignment (although may also be caused by unsynchronization or other scenarios), but inconsistency of sending directions. Therefore, the main point of the research should have a premise as described below. The sending directions are inconsistent. ---> Cross-link interference exists objectively. ---> However, due to timing misalignment, the cross-interference cancellation solution is seriously affected.

Here, the inconsistency includes the following two situations.

The data sending directions are inconsistent. ---> Cross-link interference exists objectively. ---> Timing misalignment caused by cross-link delay difference has influence on the cross-interference cancellation solution. The misaligned portion fails to be removed and may have a cross-symbol/slot influence.

The signal sending directions are inconsistent. ---> Cross-link interference exists objectively. ---> Timing misalignment has an influence on the cross interference cancellation solution (mainly referred to as a symmetric design herein, such as time-frequency block staggering, sequence orthogonality, and the like). The misaligned portion may have an influence on the symbol occupied by the entire signal.

The control portion should not be taken as a major consideration since the sending directions of DCI and UCI are aligned in the mainstream solution.

Even if the control portion is in consideration, the interference problem is not significant for reasons described below.

a. On the gNB side, gNB1 DL control reaches gNB2 after transmission delay, a gap (greater than or equal to TA plus encoding and decoding delay) exists between UL reception and DL control of gNB2, and TA is the round trip duration of the farthest UE, namely twice the transmission delay from the farthest UE to the base station. Therefore, gNB1 DL control hardly causes CLI to UL reception of gNB2 unless, of course, the transmission delay is greater than the UE TA plus encoding and decoding delay of gNB2 since gNB1 exists as a macro region and is far away from gNB2.

b. On the UE side, sending of the UL UCI of a UE2 (corresponding to gNB2) is advanced by a TA/2, and reception, by UE1, of DCI in the next slot of gNB1 is delayed by TA/2. It is assumed that UE1 and UE2 are next to each other, and the TA from UE1 to gNB1 is equal to the TA from UE2 to gNB2. Sending of UCI by UE2 is one complete TA value earlier than reception of DCI by UE1 even if the transmission delay from UE2 to UE1 is taken into account, and the transmission delay is much smaller than TA, or even much smaller than TA/2. That is, the emphasis should be as follows: CLI exists since directions of the data portion & the signal portion are different, and the interference cancellation mechanism and the symmetric signal design may be used as a solution, but the above mechanism is greatly affected due to timing misalignment caused by difference in cross-link transmission delay.

3. The specific solution is as described below.

a. Description about signal and data portions may be preferred, no emphasis is put on the "control and data portions", and the reasons are given above.

b. Description is provided by taking the timing of a receiving node as a basis. A delay difference exists from Node2 to Node1.

For example, gNB1 sends a DL and gNB2 receives a UL. The timing offset should be the offset between the UL from gNB2 itself and the DL from gNB1 received by gNB2. The gNB2 is taken as a basis. On the UE side, the UE1 receiving the DL is taken as a basis.

c. "Thus cross-link interference exists between Node1 and Node2", and as described above, timing misalignment enables existence of the CLI to be unfocused and not the main scenario. It may be assumed that cross-link interference is inherently present (especially for data) since the premise is that the second portion of gNB1 is not in the same sending direction as the second portion of gNB2. The CLI is cancelled through an interference cancellation mechanism or a symmetric signal design, but the timing misalignment degrades the robustness of the above solution mechanism (interference cancellation mechanism or symmetric signal design).

Of course, for signals, the symmetric design enables CLI interference to be cancelled. But the timing offset makes the interference influence appear again. That is, for the particular portion of the symmetric signal, the above description may be made.

d. Clear definition, measurement and the like of the TA need to be provided first.

The gNB1 sending the DL and gNB2 receiving the UL are still taken as an example. The gNB1 cannot adjust the TA. TAs are for different UEs under gNB1, and are different for UEs at different positions. The same applies to gNB2. Here, it is supposed that the two gNBs adjust their respective timings. Therefore, the TA needs to be redefined first.

The gNB side is easy to be solved. It is assumed that the transmission delay from gNB1 to gNB2 is D, it is only necessary to delay all UL receptions of gNB2 by one D.

It is more difficult to be solved on the UE side. It is assumed that the transmission delay from UE2 to UE1 is D, and the time when interference from the UL of UE2 is received after the DL of UE1 is delayed is: (TA1)/2+(TA2)/2−D.

e. No problem exists when these solutions are described in this way (Node1 adjustment or node2 adjustment, traversal), but the feasibility is limited when it specifically comes to whether to actually describe a gNB or a UE, such as DL reception on the UE side and UL interference from an adjacent UE.

f. If measurement of the TA between gNBs or between UEs is used as a solution, gNB2 performs measurement to obtain TA2-1 between gNB2 and gNB1, and delays the uplink timing of gNB2 by one TA2-1. It is to be noted that the TA2-1 is a single-trip TA and not a round-trip TA, which affects little. Alternatively, the DL of gNB1 generating interference is advanced by one TA2-1, which will affect misalignment between DCI of two cells.

UE1 performs measurement to obtain TA1-2 between UE1 and UE2, and if only the transmission delay (equivalent to D described above) is provided, the adjustment have to be performed based on TAs of the two UEs and their respective cells. If (TA1)/2+((TA2)/2−D) is included, advancement through the DL of the UE1 is not realistic, and the UL of the UE2 being delayed by one TA1-2 can meet the alignment on UE1 side, but will affect the UL timing alignment of UE2 with other UEs in the cell.

5. It is easy to be solved between gNBs. However, the UE side is relatively complex, and if the UE performs TA alignment based on the adjacent UE, the UE cannot perform uplink timing alignment on the gNB side with all other UEs in the local cell, and then the data and the signal of the UE in the local cell are staggered in time, and time-frequency blocks are misaligned, which affects data and signal reception and demodulation, etc.

Embodiment 4

The embodiment of the present disclosure further provides a storage medium. Optionally, in the present embodiment, the storage medium may be configured to store program codes for performing at least one of the steps described below.

In S1, a time unit is obtained.

In S2, at least one of uplink transmission or downlink transmission is performed on a spectrum resource corresponding to the time unit.

Optionally, in the present embodiment, the storage medium may include, but is not limited to, a USB flash disk, a read-only memory (ROM), a random access memory (RAM), a mobile hard disk, a magnetic disk, an optical disk or another medium capable of storing program codes.

Optionally, in the present embodiment, a processor is used to execute, according to the program codes stored in the storage medium, the step of obtaining the time unit.

Optionally, in the present embodiment, the processor is used to execute, according to the program codes stored in the storage medium, the step of performing at least one of uplink transmission or downlink transmission on the spectrum resource corresponding to the time unit.

Optionally, for specific examples in the present embodiment, reference may be made to the examples described in the above-mentioned embodiments and optional implementation modes, and repetition will not be made in the present embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

The present disclosure is applicable to the field of communications and is used for solving cross-link interference in the flexible duplex/dynamic TDD transmission mode in the related art, which is caused by at least one of the following: the timing relationship between the PDCCH and the downlink data is different from the timing relationship between the PDCCH and the uplink data; different numerology may be used in the uplink and downlink transmission links; the numbers of symbols occupied by control channels of different devices are different; and the relative timing offset between different devices exceeds duration of the cyclic prefix. The stability of transmitting a signal by a communication device is improved. The cross-link interference in the flexible duplex/dynamic TDD transmission mode in the related art can be solved, and the stability of transmitting a signal by a communication device is improved.

What is claimed is:

1. A method for aligning uplink transmission with downlink transmission, comprising at least one of:
configuring, by a transmission device, multiple timing advance (TA) adjustment amounts for multiple channels or signals over time units, wherein different channels or signals have different TA adjustment amounts, and wherein the multiple channels or signals comprises physical downlink control channel, downlink reference signal, and downlink data, or the multiple channels or signals comprises physical uplink control channel, uplink reference signal, and uplink data; and
performing, by the transmission device, uplink transmission or downlink transmission according to the multiple channels or signals configured with multiple TA adjustment amounts;
wherein each of the time units is at least one of: an orthogonal frequency division multiplexing symbol, a sub-slot, a slot, a sub-frame, or a specific time interval.

2. The method of claim 1, wherein the time units comprise a first cyclic prefix, a second cyclic prefix, and a third cyclic prefix, and a relationship among at least one of duration of the first cyclic prefix, duration of the second cyclic prefix, or duration of the third cyclic prefix comprises at least one of: the duration of the first cyclic prefix being longer than the duration of the second cyclic prefix; the duration of the third cyclic prefix being longer than the duration of the first cyclic prefix; or the duration of the third cyclic prefix being longer than the duration of the second cyclic prefix;
- wherein the time units comprise a first time unit, and the first time unit comprises at least one of: the first cyclic prefix, a physical downlink control channel, or a gap; and/or
- wherein the time units comprise a second time unit, and the second time unit comprises at least one of: the second cyclic prefix, a reference signal, or a gap; and/or
- wherein the time units comprise a third time unit, and the third time unit comprises at least one of: the second cyclic prefix, a data unit, or a gap; and/or
- wherein the time units comprise a fourth time unit, and the fourth time unit comprises at least one of: the second cyclic prefix, a gap, a physical uplink control channel, or uplink reference signal.

3. The method of claim 2, wherein the gap is located in front of the first cyclic prefix or behind the physical downlink control channel, or is located in front of the first cyclic prefix and behind the physical downlink control channel.

4. The method of claim 2, wherein during transmission of an uplink reference signal, a first gap is located in front of the second cyclic prefix, and the uplink reference signal is located behind the second cyclic prefix; or the first gap is located behind the uplink reference signal, and the second cyclic prefix is located in front of the uplink reference signal; or the first gap is located at least one of: behind the uplink reference signal or in front of the second cyclic prefix; and/or
- wherein during transmission of an uplink reference signal, a first gap of the second time unit is located in front of a third cyclic prefix, and the uplink reference signal is located behind the third cyclic prefix; or the first gap is located behind the uplink reference signal, and the third cyclic prefix is located in front of the uplink reference signal; or the first gap is located at least one of: behind the uplink reference signal or in front of the third cyclic prefix; and/or
- wherein during transmission of a downlink reference signal, the downlink reference signal is located behind the second cyclic prefix, or the downlink reference signal is located behind the second cyclic prefix, and a first gap is located behind the downlink reference signal; or the first gap is located in front of the second cyclic prefix, and the downlink reference signal is located behind the second cyclic prefix; or the first gap is located at least one of: behind the downlink reference signal or in front of the second cyclic prefix; and/or
- wherein during transmission of a downlink reference signal, the downlink reference signal is located behind a third cyclic prefix; or the first gap is located in front of the third cyclic prefix, and the downlink reference signal is located behind the third cyclic prefix; or a first gap of the second time unit is located in front of the third cyclic prefix, and the downlink reference signal is located behind the third cyclic prefix; or the first gap is located at least one of: behind the downlink reference signal or in front of the third cyclic prefix.

5. The method of claim 2, wherein a relationship among at least one of the second cyclic prefix, the data unit or a second gap comprises at least one of: the second cyclic prefix being located in front of the data unit; the second gap being located behind the data unit; or the second gap being located at a beginning or in front of the data unit; and/or
- wherein a relationship among at least one of the second cyclic prefix, a third gap, the data unit or a second gap comprises at least one of: the second cyclic prefix being located behind the third gap; the second cyclic prefix being located in front of the data unit; or the second gap being located behind the data unit; and/or
- wherein a relationship among at least one of the third cyclic prefix, the data unit, or a second gap comprises at least one of: the third cyclic prefix being located in front of the data unit or the second gap being located behind the data unit; and/or
- wherein a relationship among at least one of the third cyclic prefix, a third gap, the data unit, or a second gap comprises at least one of: the third cyclic prefix being located behind the third gap; the third cyclic prefix being located in front of the data unit; or the second gap being located behind the data unit.

6. The method of claim 5, wherein at least one of the second cyclic prefix or the third cyclic prefix is used in at least one subunit of the data unit.

7. The method of claim 2, wherein a relationship among at least one of the second cyclic prefix, a fourth gap, the physical uplink control channel, or a fifth gap comprises at least one of: the second cyclic prefix being located behind the fourth gap; the second cyclic prefix being located in front of the physical uplink control channel; or the fifth gap being located behind the physical uplink control channel.

8. The method of claim 2, wherein during transmission of the downlink reference signal, a relationship among at least one of the third cyclic prefix, a fourth gap, the physical uplink control channel, or a fifth gap comprises at least one of: the third cyclic prefix being located behind the fourth gap; the third cyclic prefix being located in front of the physical uplink control channel; or the fifth gap being located behind the physical uplink control channel; and/or
- wherein during transmission of the uplink reference signal, a relationship among at least one of the second cyclic prefix, the physical uplink control channel, a fifth gap, or a sixth gap comprises at least one of: the second cyclic prefix being located in front of the physical uplink control channel; the fifth gap being located behind the physical uplink control channel; the sixth gap being located in front of the second cyclic prefix; or the physical uplink control channel being located behind the second cyclic prefix; and/or
- wherein during transmission of the uplink reference signal, a relationship among at least one of the third cyclic prefix, the physical uplink control channel, a fifth gap, or a sixth gap comprises at least one of: the third cyclic prefix being located in front of the physical uplink control channel; the fifth gap being located behind the physical uplink control channel; the sixth gap being located in front of the third cyclic prefix; or the physical uplink control channel being located behind the third cyclic prefix.

9. The method of claim 2, wherein the fourth time unit is comprised in the second time unit.

10. The method of claim 8, wherein the fourth time unit is located at a front end of the second time unit, or the fourth time unit is located behind the second time unit, or the fourth time unit comprises the second time unit.

11. The method of claim 2, wherein at least one of the first time unit, the second time unit, the third time unit, or the fourth time unit in the time units is configured with one or more TA adjustment amounts, or the first time unit, the second time unit, the third time unit, and the fourth time unit in the time units each are configured with a TA adjustment amount;

wherein the TA adjustment amount is used for advancing the adjustment amount forward or delaying the adjustment amount backward.

12. The method of claim 2, wherein at least one of duration, a starting position or an ending position of at least one of the time units, the sub-time unit, the first time unit, the second time unit, the third time unit, the fourth time unit, the cyclic prefix, the gap, the reference signal, data, a control channel, or the TA adjustment amount is determined through at least one of: predefinition, physical layer downlink control information (DCI) signaling, or higher-layer radio resource control (RRC) signaling.

13. The method of claim 2, wherein a position of the reference signal in the second time unit is related to at least one of:

a number of symbols occupied by the physical downlink control channel, whether a physical uplink control channel is prefixed, a timing relationship relative to the physical downlink control channel, duration of a cyclic prefix located in front of the reference signal, or a relative timing offset amount between different devices.

14. The method of claim 1, wherein before performing, by the transmission device, uplink transmission or downlink transmission according to the multiple channels or signals configured with multiple TA adjustment mounts, the method further comprises at least one of:

adjusting, by the transmission device, a position of a gap relative to at least one of a control channel, a data channel or a reference signal in the time units to align an uplink signal with a downlink signal;

adjusting, by the transmission device, a position of a cyclic prefix located in front of at least one of the control channel, the data channel or the reference signal in the time units to align the uplink signal with the downlink signal;

adjusting, by the transmission device, the TA adjustment amount of the time units to align different devices; or adjusting, by the transmission device, a TA adjustment amount of at least one of a first time unit, a second time unit, a third time unit or a fourth time unit in the time units to align the different devices, or to align the different devices in at least one time unit.

15. The method of claim 1, wherein before configuring, by the transmission device, multiple TA adjustment amounts for multiple channels or signals over the time units, the method further comprises:

obtaining, by the transmission device, a timing offset relative to other devices based on measurement, wherein the transmission device is at least one of a base station or a terminal.

16. The method of claim 15, wherein a measurement quantity for measuring the timing offset relative to the other devices comprises at least one of: a radio resource management (RRM) measurement signal, a reference signal receiving power (RSRP) measurement signal or a demodulation reference signal (DMRS) measurement signal.

17. The method of claim 16, wherein in a case where the transmission device is a terminal, the method comprises at least one of:

receiving, by the terminal, physical downlink shared channel (PDSCH) data sent by the base station to obtain at least one of: a timing offset, timing, or a TA adjustment amount;

receiving, by the terminal, a preamble before sending of the PDSCH, and obtaining, based on preamble measurement, at least one of: the timing offset, the timing, or the TA adjustment amount;

receiving, by the terminal, at least one of: the timing offset, the timing, or the TA adjustment amount indicated by the base station; or performing, by the terminal, at least one of following operations on a designated resource configured or reserved by the base station: timing synchronous tracking; or measurement of at least one of: the timing offset, the timing or the TA adjustment amount.

18. The method of claim 17, further comprising:

notifying, by the terminal, the base station of at least one of the timing offset, the timing, or the TA adjustment amount.

19. An apparatus for aligning uplink transmission with downlink transmission, comprising a processor and a storage device for storing computer executable instructions that when executed by the processor cause the processor to perform at least one of following operations:

configure multiple timing advance (TA) adjustment amounts for multiple channels or signals over time units, wherein different channels or signals have different TA adjustment amounts, and wherein the multiple channels or signals comprises physical downlink control channel, downlink reference signal, and downlink data, or the multiple channels or signals comprises physical uplink control channel, uplink reference signal, and uplink data; and performing uplink transmission or downlink transmission according to the multiple channels or signals configured with multiple TA adjustment amounts;

wherein each of the time units is at least one of: an orthogonal frequency division multiplexing symbol, a sub-slot, a slot, a sub-frame, or a specific time interval.

20. A non-transitory storage medium storing program codes that, when executed by a device, cause the device to perform at least one of following steps:

configuring, by a transmission device, multiple timing advance (TA) adjustment amounts for multiple channels or signals over time units, wherein different channels or signals have different TA adjustment amounts, and wherein the multiple channels or signals comprises physical downlink control channel, downlink reference signal, and downlink data, or the multiple channels or signals comprises physical uplink control channel, uplink reference signal, and uplink data; and performing uplink transmission or downlink transmission according to the multiple channels or signals configured with multiple TA adjustment amounts;

wherein each of the time units is at least one of: an orthogonal frequency division multiplexing symbol, a sub-slot, a slot, a sub-frame, or a specific time interval.

* * * * *

UNITED STATES PATENT AND TRADEMARK OFFICE
CERTIFICATE OF CORRECTION

| | | |
|---|---|---|
| PATENT NO. | : 11,283,558 B2 | Page 1 of 1 |
| APPLICATION NO. | : 16/476811 | |
| DATED | : March 22, 2022 | |
| INVENTOR(S) | : Ling Yang | |

It is certified that error appears in the above-identified patent and that said Letters Patent is hereby corrected as shown below:

In the Claims

Column 38, Line 51, Claim 1, delete "comprising at least one of" and insert --comprising--.

Signed and Sealed this
Fifth Day of July, 2022

*Katherine Kelly Vidal*

Katherine Kelly Vidal
*Director of the United States Patent and Trademark Office*